(12) United States Patent
Tsuda et al.

(10) Patent No.: US 10,290,291 B2
(45) Date of Patent: May 14, 2019

(54) INFORMATION PROCESSING APPARATUS, METHOD, AND PROGRAM FOR CONTROLLING OUTPUT OF A PROCESSING PATTERN IN ASSOCIATION WITH REPRODUCED CONTENT

(71) Applicant: SONY MOBILE COMMUNICATIONS INC., Tokyo (JP)

(72) Inventors: Takamoto Tsuda, Kanagawa (JP); Kohei Takada, Tokyo (JP); Yusuke Otani, Kanagawa (JP); Yusuke Doyama, Kanagawa (JP); Yoji Hirose, Kanagawa (JP); Taro Takamoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 10 days.

(21) Appl. No.: 15/639,657

(22) Filed: Jun. 30, 2017

(65) Prior Publication Data
US 2018/0018950 A1    Jan. 18, 2018

(30) Foreign Application Priority Data

Jul. 13, 2016    (JP) .................................. 2016-138922

(51) Int. Cl.
*G06F 17/00* (2019.01)
*G10H 1/36* (2006.01)
*G06F 3/16* (2006.01)

(52) U.S. Cl.
CPC ............. *G10H 1/368* (2013.01); *G06F 3/165* (2013.01); *G10H 2220/081* (2013.01)

(58) Field of Classification Search
CPC ........................................................ G06F 3/165
See application file for complete search history.

(56) References Cited

U.S. PATENT DOCUMENTS

2008/0257133 A1\* 10/2008 Sasaki .................. G10H 1/0025
84/604
2009/0260506 A1\* 10/2009 Saperston .......... A63B 71/0686
84/612
2017/0136354 A1    5/2017 Yamano et al.

FOREIGN PATENT DOCUMENTS

JP        2015-231098        12/2015

\* cited by examiner

*Primary Examiner* — Joseph Saunders, Jr.
(74) *Attorney, Agent, or Firm* — XSENSUS LLP

(57) ABSTRACT

There is provided an information processing apparatus including a decision unit configured to decide, in accordance with playback target content, a processing pattern of processing to be executed in association with playback of the content, from among a plurality of processing patterns.

19 Claims, 27 Drawing Sheets

FIG. 5

| TIME | QUADRUPLE TIME | | | | | | | | | TRIPLE TIME | ... |
|---|---|---|---|---|---|---|---|---|---|---|---|
| GENRE | LATIN | | | | SLOW BALLAD | | | | | | |
| PART | verse1 | verse2 | chorus | ... | verse1 | verse2 | ... | ... | ... | ... | ... |
| PATTERN | 4-A-a-1 | 4-A-b-1 | 4-A-c-1 | ... | 4-B-a-1 | 4-B-b-1 | ... | ... | ... | ... | ... |
| | 4-A-a-2 | 4-A-b-2 | 4-A-c-2 | ... | 4-B-a-2 | 4-B-b-2 | ... | ... | ... | ... | ... |
| | 4-A-a-3 | 4-A-b-3 | 4-A-c-3 | ... | 4-B-a-3 | 4-B-b-3 | ... | ... | ... | ... | ... |
| | ... | ... | ... | ... | ... | ... | ... | ... | ... | ... | ... |

124

1240 — TIME
1242 — GENRE
1244 — PART
1246 — PATTERN

FIG. 10
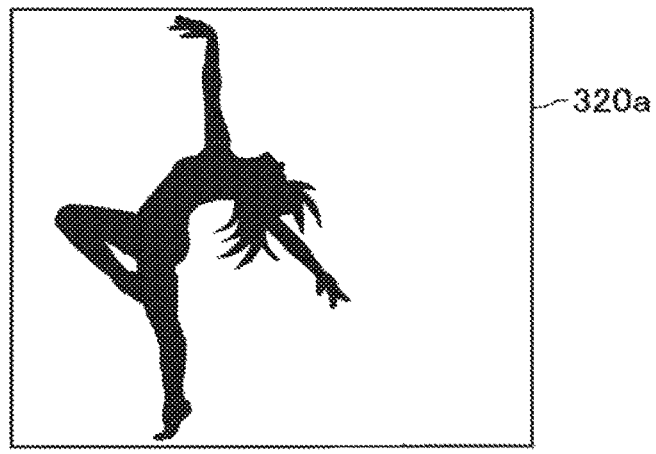
320a
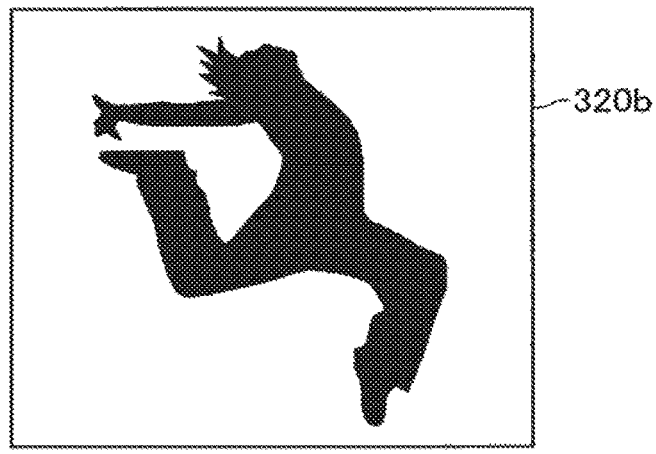
320b
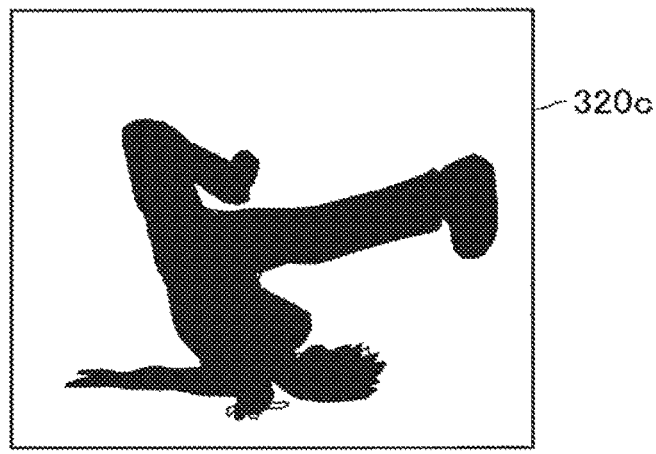
320c

INFORMATION PROCESSING APPARATUS, METHOD, AND PROGRAM FOR CONTROLLING OUTPUT OF A PROCESSING PATTERN IN ASSOCIATION WITH REPRODUCED CONTENT

CROSS REFERENCE TO RELATED APPLICATIONS

This application claims the benefit of Japanese Priority Patent Application JP 2016-138922 filed Jul. 13, 2016, the entire contents of which are incorporated herein by reference.

BACKGROUND

The present disclosure relates to an information processing apparatus, an information processing method, and a program.

Various apparatuses that play content, such as music and images, have been developed. In addition, various technologies of producing vibration, emitting light, and driving a device on the basis of a control signal from the outside have been proposed.

For example, JP 2015-231098A describes a technology in which, in the case where a vibration apparatus acquires an audio signal from an electronic device, vibration is produced on the basis of the acquired audio signal.

SUMMARY

The technology described in JP 2015-231098A, however, is limited in the type of vibration that can be produced when an audio signal is acquired. For example, the technology described in JP 2015-231098A can produce only vibration dependent on the time series of the acquired audio signal.

Hence, the present disclosure proposes a novel and improved information processing apparatus, information processing method, and program that make it possible to execute a larger number of types of processing in association with content playback.

According to an embodiment of the present disclosure, there is provided an information processing apparatus including a decision unit configured to decide, in accordance with playback target content, a processing pattern of processing to be executed in association with playback of the content, from among a plurality of processing patterns.

In addition, according to an embodiment of the present disclosure, there is provided an information processing method including deciding, in accordance with playback target content, a processing pattern of processing to be executed in association with playback of the content, from among a plurality of processing patterns, by a processor.

In addition, according to an embodiment of the present disclosure, there is provided a program causing a computer to function as a decision unit configured to decide, in accordance with playback target content, a processing pattern of processing to be executed in association with playback of the content, from among a plurality of processing patterns.

According to an embodiment of the present disclosure, it is possible to execute a larger number of types of processing in association with content playback. Note that the effects described above are not necessarily limitative. With or in the place of the above effects, there may be achieved any one of the effects described in this specification or other effects that may be grasped from this specification.

BRIEF DESCRIPTION OF THE DRAWINGS

FIG. 5 is an explanatory diagram illustrating a configuration example of a processing pattern DB 124 according to the first embodiment;

FIG. 10 is an explanatory diagram illustrating an example of a frame image included in an animation pattern;

DETAILED DESCRIPTION OF THE EMBODIMENT(S)

Figure 1:
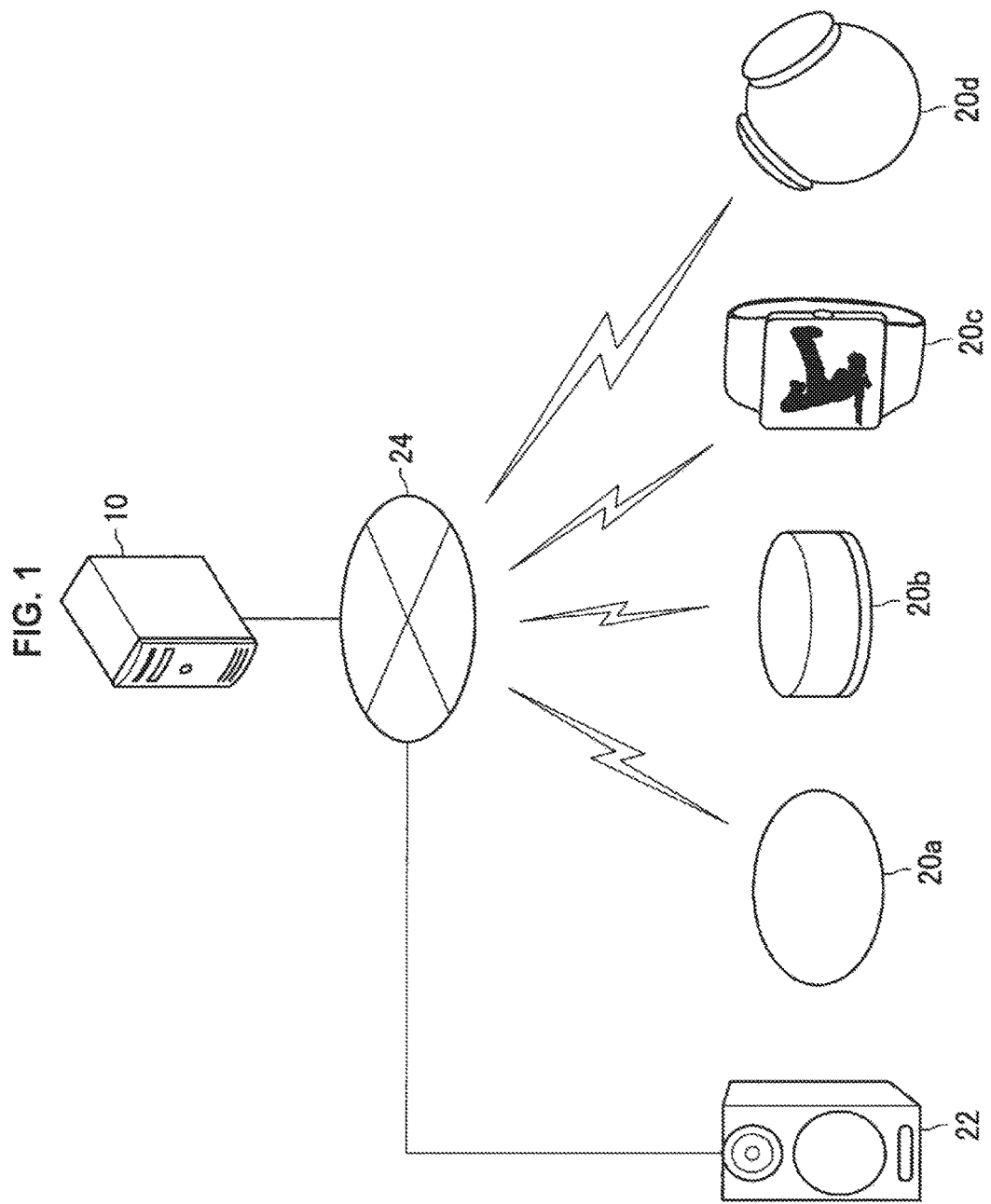
FIG. 1 is an explanatory diagram illustrating a configuration example of an information processing system according to a first embodiment.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that, in this specification and the appended drawings, structural elements that have substantially the same function and structure are sometimes distinguished from each other using different alphabets after the same reference sign. For example, if necessary, structural elements that have substantially the same function and structure (e.g., devices 20a and 20b) are distinguished from each other. However, when it is not particularly necessary to distinguish structural elements that have substantially the same function and structure, the same reference sign alone is attached. For example, when it is not particularly necessary to distinguish the devices 20a and 20b from each other, each apparatus is simply called a device 20.

The "detailed description of the embodiment(s)" is given in accordance with the following order of items.
1. First embodiment
2. Second embodiment
3. Hardware configuration
4. Modification examples

1. First Embodiment

Now, a first embodiment is described. The background to the first embodiment is described first to clearly show features of the first embodiment.

Technologies of producing vibration concurrently with playback of music have been developed. For example, a known technology produces vibration concurrently with playback of music by amplifying a bass section of playback target music. In this technology, however, produced vibration is limited by the time series of signals of the music, and thus vibration beyond the bounds of the original music cannot be produced. Moreover, in the case where the same tune is played a plurality of times, the same vibration may be produced every time. Consequently, producing vibration cannot give a strong impression to a user listening to music. Then, the user may feel tedious or bored with the produced vibration.

Hence, in view of the circumstances described above, an information processing apparatus 10 according to the first embodiment has been devised. According to the first embodiment, the information processing apparatus 10 can decide a processing pattern of processing (e.g., vibration) to be executed in association with content playback from among a plurality of processing patterns registered in advance, in accordance with playback target content, and control execution of processing corresponding to the decided processing pattern. This makes it possible to execute a larger number of types of processing (e.g., causing vibration in a silent section, or causing vibration with timing shifted from that of played sound) when content is played. This enables a rendering giving a stronger impression to a user who uses the content. Here, use of content includes listening to music and viewing a moving image.

<1-1. Configuration of Information Processing System>

Next, a configuration of an information processing system according to the first embodiment is described. FIG. 1 is an explanatory diagram illustrating a configuration example of the information processing system according to the first embodiment. As illustrated in FIG. 1, the information processing system according to the first embodiment includes the information processing apparatus 10, a device 20, a content playback apparatus 22, and a communication network 24.

{1-1-1. Information Processing Apparatus 10}

The information processing apparatus 10 performs control related to content playback. For example, the information processing apparatus 10 is capable of transmitting playback control information for playing playback target content to the content playback apparatus 22 via the communication network 24, for example. Here, content is, for example, music, a still image, a moving image, a combination of a moving image and music, etc. Note that description will be given mainly on an example in which the content is music.

In addition, the information processing apparatus 10 performs control to cause the device 20 to execute processing in association with content playback. For example, first, the information processing apparatus 10 decides, in accordance with playback target content, a processing pattern of processing to be executed in association with playback of the content from among a plurality of processing patterns registered in advance. Then, the information processing apparatus 10 transmits processing control information for executing processing corresponding to the decided processing pattern to the device 20 via the communication network 24, for example. Here, processing includes processing of producing vibration, display processing, or processing of moving the device 20. The plurality of processing patterns are (unique) patterns different from each other, and may be generated in advance regardless of content, for example. Note that a processing pattern is, for example, a vibration pattern, an illumination pattern, an animation pattern, or a motion pattern. The length of a processing pattern may be, for example, a length corresponding to one bar. Each processing pattern may have a value of a predetermined parameter. Note that specific details of vibration patterns, illumination patterns, animation patterns, and motion patterns are described later.

For example, the information processing apparatus 10 performs control to cause the device 20 to produce vibration of a vibration pattern corresponding to music, concurrently with playback of the music. Thus, a user listening to music can concurrently experience the music and vibration with regularity not limited by the bounds of the music. For example, the user may feel as if performance of another genre is added to the music.

This information processing apparatus 10 may be, for example, a server, a personal computer (PC), a mobile phone such as a smartphone, a tablet terminal, or a game console.

{1-1-2. Device 20}

The device 20 is an example of a control target in an embodiment of the present disclosure. The device 20 is a device that performs vibration, display (e.g., light emission), movement, or the like on the basis of control by the information processing apparatus 10, for example. This device 20 includes, for example, one or more of a vibration unit, a display unit, and a drive unit. Here, the vibration unit is composed of, for example, a vibration speaker type, a linear actuator type, a piezo actuator type, or a vibration motor type. The display unit may include, for example, a display configured with a liquid crystal display (LCD) or an organic light emitting diode (OLED), or a light emitting diode (LED). The device 20 may further include any of various sensors, such as an acceleration sensor, a vibration sensor, a pulse sensor, a temperature sensor, or a perspiration sensor.

For example, on receiving processing control information from the information processing apparatus 10, the device 20 executes processing in accordance with a processing pattern indicated by the received processing control information. As an example, a vibration device 20a produces vibration in accordance with a vibration pattern indicated by the received processing control information. A light-emitting device 20b emits light in accordance with an illumination pattern indicated by the received processing control information. A smartwatch 20c displays a moving image corresponding to an animation pattern indicated by the received processing control information on a display screen. A movable speaker 20d moves in accordance with a motion pattern indicated by the received processing control information.

FIG. 1 illustrates an example in which the device 20 is the vibration device 20a, the light-emitting device 20b, the smartwatch 20c, or the movable speaker 20d, but the device 20 is not limited to such examples. For example, the device 20 may be another device that is carriable by a user, such as a mobile phone such as a smartphone, a tablet terminal, a portable game console, or a portable music player. Alternatively, the device 20 may be, for example, an eyeglass-type device such as a head mounted display (HMD), a smartband, a headset, a headphone, a necklace-type device, a ring-type device, a bracelet-type device, a headband-type device, a bag-type device, a clothing device, or another wearable device such as a contact lens device. Alternatively, the device 20 may be a desktop monitor, a television receiver, a PC, lighting equipment, a vehicle (e.g., a car or a bicycle), a robot (e.g., a drone), or the like. Alternatively, the device 20 may be a seat, a handle, etc. of a car.

{1-1-3. Content Playback Apparatus 22}

The content playback apparatus 22 is an apparatus for playing content. For example, on receiving playback control information from the information processing apparatus 10, the content playback apparatus 22 plays content indicated by the received playback control information. Note that FIG. 1 illustrates an example in which the content playback apparatus 22 is an audio output apparatus, but without being limited to this example, the content playback apparatus 22 may be a display apparatus configured with an LCD or an OLED, for example, or an apparatus including both an audio output apparatus and a display apparatus.

{1-1-4. Communication Network 24}

The communication network 24 is a wired or wireless transmission line for information that is transmitted from an apparatus connected to the communication network 24. For example, the communication network 24 may include a public network such as a telephone network, the Internet, and a satellite communication network, various local area networks (LANs) including Ethernet (registered trademark), and a wide area network (WAN). Moreover, the communication network 24 may include a leased line network such as Internet Protocol-Virtual Private Network (IP-VPN).

The configuration of the information processing system according to the first embodiment is not limited to the example described above. For example, the information processing apparatus 10 may be able to communicate with the device 20 and the content playback apparatus 22 not via the communication network 24 but directly by wired communication or wireless communication. The information processing apparatus 10 and the device 20, or the information processing apparatus 10 and the content playback apparatus 22 may be configured integrally, instead of being configured as independent apparatuses. Alternatively, the device 20 and the content playback apparatus 22 may be configured integrally, instead of being configured as independent apparatuses.

{1-1-5. Examples of Playback Flow of Content and Vibration}

Here, specific examples of the playback flow of content and vibration based on the aforementioned information processing system are described in "1-1-5-1. Playback example 1" to "1-1-5-4. Playback example 4".

(1-1-5-1. Playback Example 1)

Figure 2:
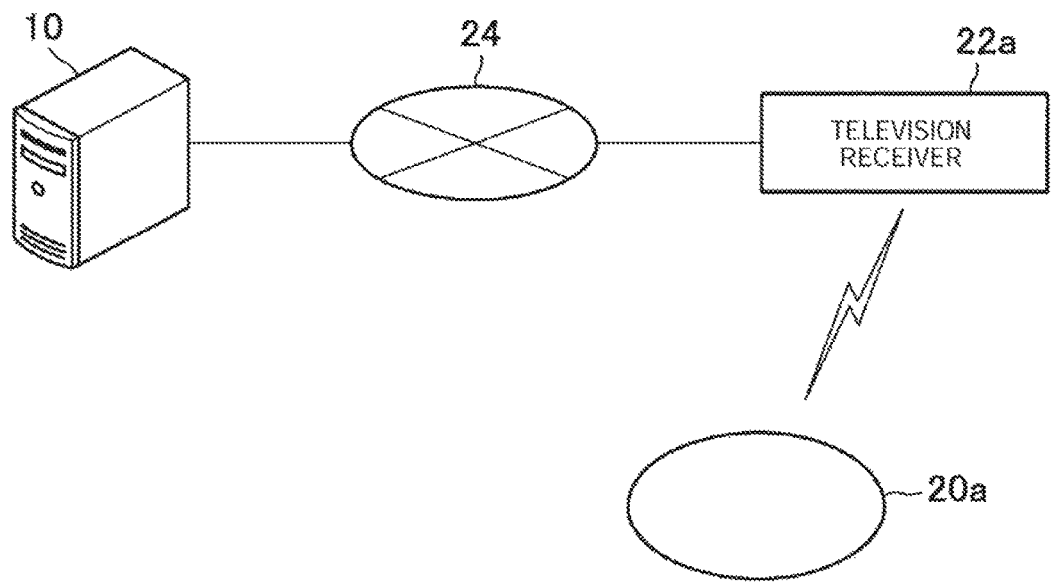
FIG. 2 is an explanatory diagram illustrating a specific example of an information processing system according to the first embodiment.

First, a playback example 1 is described with reference to FIG. 2. FIG. 2 schematically illustrates a configuration of an information processing system according to the playback example 1. The playback example 1 assumes that playback target video data and vibration data are stored in the information processing apparatus 10. As illustrated in FIG. 2, first, the information processing apparatus 10 transmits the video data and the vibration data to a television receiver 22a (an example of the content playback apparatus) via the communication network 24 by streaming, for example. After that, on receiving these data, the television receiver 22a starts playback of the received video data, and also transmits the received vibration data to the vibration device 20a by wireless communication such as Bluetooth (registered trademark). After that, the vibration device 20a produces vibration in accordance with the received vibration data.

(1-1-5-2. Playback Example 2)

Next, a playback example 2 is described. Note that also the playback example 2 assumes that playback target video data and vibration data are stored in the information processing apparatus 10.

In the playback example 2, the television receiver 22a superimposes the vibration data received from the information processing apparatus 10 on an inaudible region of sound to be output (e.g., sound in the video data) and outputs the resulting sound (instead of performing wireless communication with the vibration device 20a). Then, in the case where the vibration device 20a includes a microphone, the vibration device 20a first collects the sound output by the television receiver 22a, takes out vibration data on the basis of the collected sound, and then produces vibration in accordance with the vibration data. Alternatively, a terminal 26 (e.g., smartphone) that includes a microphone and is positioned near the television receiver 22a may transmit the vibration data to the vibration device 20a on the basis of collection of the sound output by the television receiver 22a. More specifically, the terminal 26 first collects the sound output by the television receiver 22a, takes out vibration data on the basis of the collected sound, and then transmits the vibration data to the vibration device 20a by wireless communication such as Bluetooth (registered trademark). After that, the vibration device 20a produces vibration in accordance with the received vibration data.

(1-1-5-3. Playback Example 3)

Figure 3:
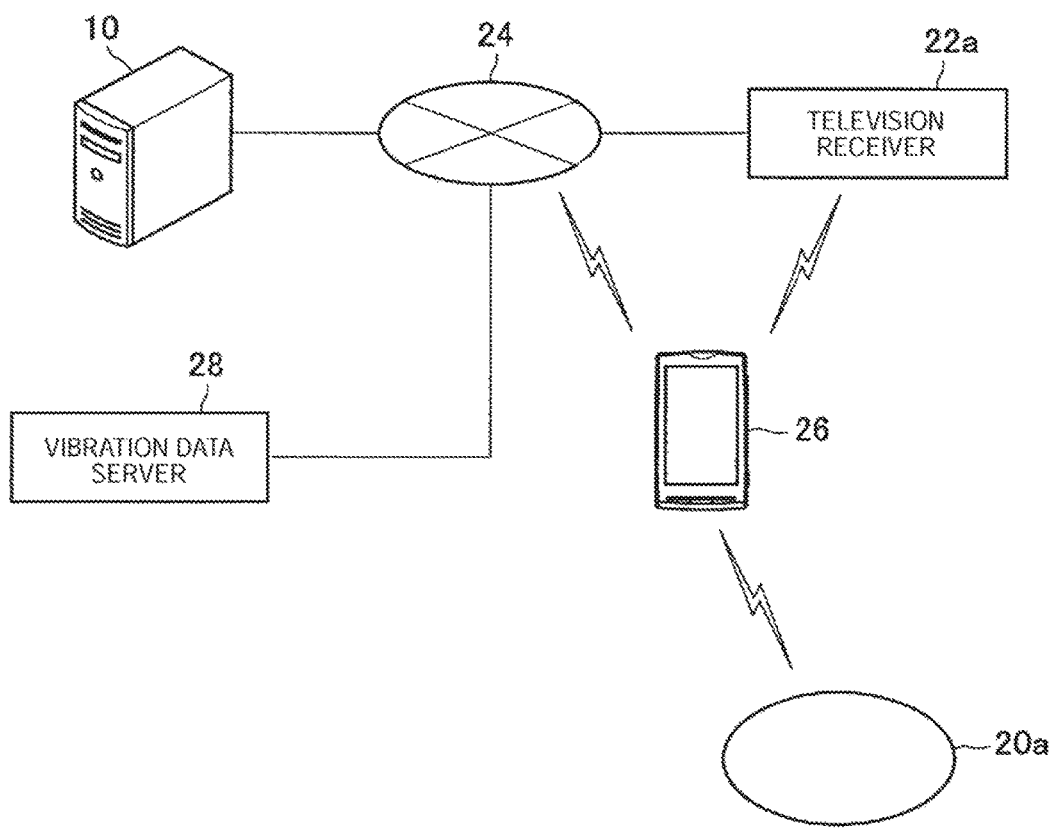
FIG. 3 is an explanatory diagram illustrating another specific example of an information processing system according to the first embodiment.

Next, a playback example 3 is described with reference to FIG. 3. FIG. 3 schematically illustrates a configuration of an information processing system according to the playback example 3. As illustrated in FIG. 3, the information processing system further includes the terminal 26 and a vibration data server 28 (in comparison with the system illustrated in FIG. 2). Here, it is assumed that the terminal 26 is positioned within a range that allows communication with the television receiver 22a and the vibration device 20a by wireless communication such as Bluetooth (registered trademark). The vibration data server 28 stores vibration data in association with a content ID, for example. The information processing apparatus 10 does not store vibration data.

In the playback example 3, before starting playback of video data, the television receiver 22a first transmits a playback start signal (including a content ID) of the video data to the terminal 26 by wireless communication such as Bluetooth (registered trademark). After that, the terminal 26 transmits a request for provision of vibration data corresponding to the received content ID to the vibration data server 28 via the communication network 24. After that, on receiving the relevant vibration data from the vibration data server 28, the terminal 26 transmits a notification indicating completion of playback preparation of the vibration data to the television receiver 22a. After that, the television receiver 22a starts playback of the relevant video data, and also transmits a synchronization signal to the terminal 26 at regular intervals. After that, the terminal 26 sequentially transmits the already received vibration data section by section to the vibration device 20a, in accordance with the synchronization signal received from the television receiver 22a. As a modification example, on this occasion, the terminal 26 may receive playback status information and playback position information corresponding to the relevant vibration data from the vibration data server 28 at regular intervals. Then, the terminal 26 may adjust transmission timing of the vibration data to the vibration device 20a on the basis of the playback status information and the playback position information.

After that, at each reception of part of the vibration data, the vibration device 20a produces vibration in accordance with the received data.

Modification Example

As a modification example of the playback example 3, a user may be able to control playback timing of the relevant video data and vibration data, on the basis of user manipulation on the terminal 26 (e.g., smartphone).

(1-1-5-4. Playback Example 4)

Next, a playback example 4 is described. Description will be given mainly on details different from those of the playback example 3.

In the playback example 4, the television receiver 22a superimposes a playback start signal (including a content ID) of the video data on an inaudible region of sound to be output (e.g., sound in the video data) and outputs the resulting sound (instead of performing wireless communication with the vibration device 20a). After that, the terminal 26 collects the sound output by the television receiver 22a, takes out a content ID on the basis of the collected sound, and then transmits a request for provision of vibration data corresponding to the content ID to the vibration data server 28 via the communication network 24. In addition, the television receiver 22a superimposes a synchronization signal on an inaudible region of the sound in the video data at regular intervals during playback of the video data. Then, the terminal 26 collects the sound output by the television receiver 22a, takes out a synchronization signal on the basis of the collected sound, and then sequentially transmits the already received vibration data section by section to the vibration device 20a, in accordance with the synchronization signal. After that, at each reception of part of the vibration data, the vibration device 20a produces vibration in accordance with the received data.

<1-2. Configuration>

Figure 4:
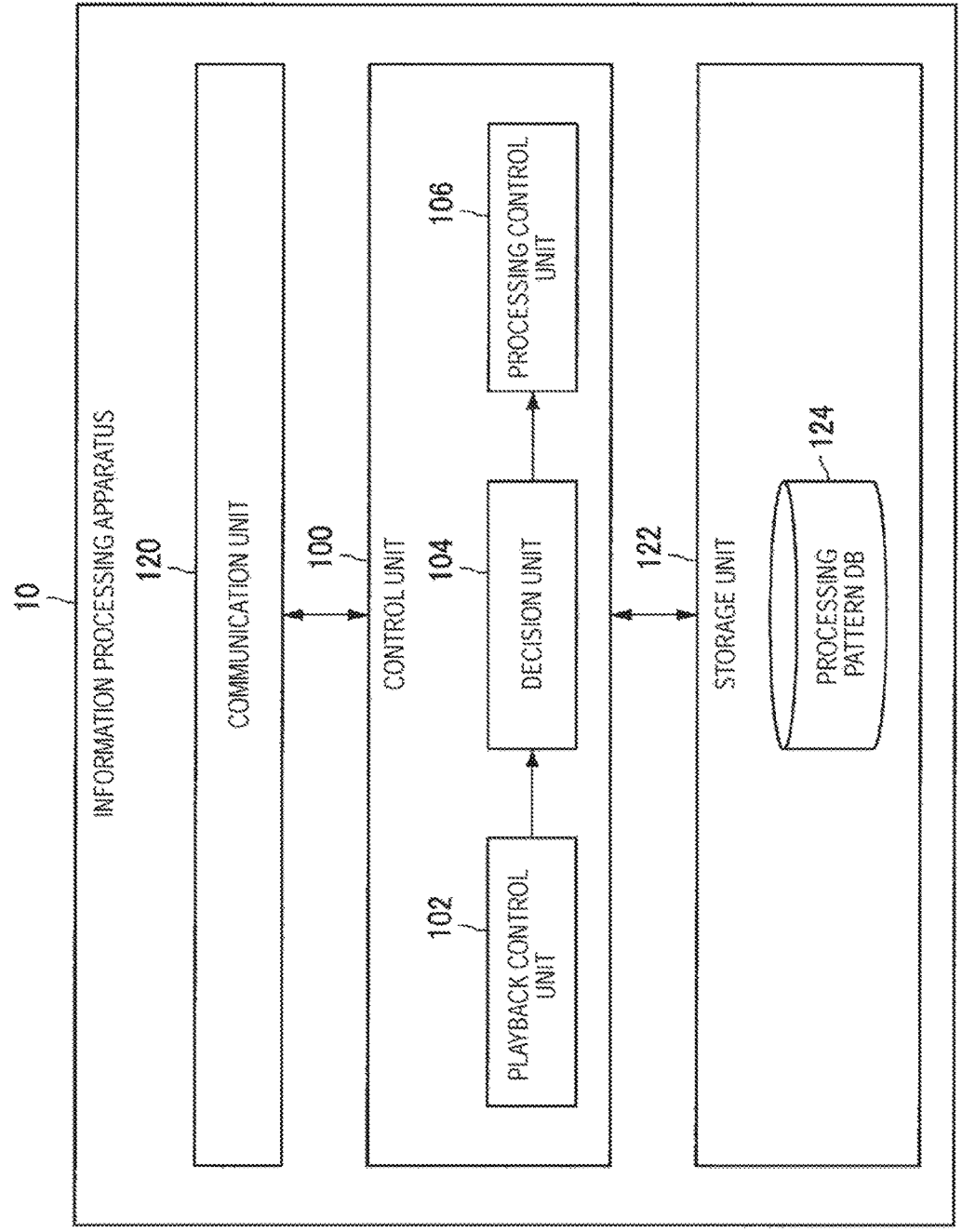
FIG. 4 is a functional block diagram illustrating a configuration example of an information processing apparatus 10 according to the first embodiment.

The configuration of the information processing system according to the first embodiment has been described. Next, a configuration of the information processing apparatus 10 according to the first embodiment is described in detail. FIG. 4 is a functional block diagram illustrating a configuration example of the information processing apparatus 10 according to the first embodiment. As illustrated in FIG. 4, the information processing apparatus 10 includes a control unit 100, a communication unit 120, and a storage unit 122.

{1-2-1. Control Unit 100}

The control unit 100 controls the overall operation of the information processing apparatus 10 by using hardware such as a central processing unit (CPU) 150 and a random access memory (RAM) 154, which are described later, built in the information processing apparatus 10. As illustrated in FIG. 4, the control unit 100 includes a playback control unit 102, a decision unit 104, and a processing control unit 106.

{1-2-2. Playback Control Unit 102}

The playback control unit 102 performs content playback control on, for example, the content playback apparatus 22. For example, the playback control unit 102 first decides playback target content. As an example, the playback control unit 102 decides the playback target content on the basis of a content playback list set in advance. Alternatively, in the case where a content playback request is received from a user's terminal, the playback control unit 102 decides content indicated by the playback request as the playback target content.

Then, the playback control unit 102 causes the communication unit 120 to transmit playback control information for playing the decided playback target content to the content playback apparatus 22.

When the device 20 is executing processing such as production of vibration during content playback, the playback control unit 102 can dynamically change the content playback in response to detection of user manipulation on the device 20 (e.g., tapping or shaking). This will be described in detail later. For example, in response to the detection, the playback control unit 102 may dynamically change the playback speed, tempo (e.g., beats per minute (BPM)), volume, or the like of the content. As an example, in the case where it is detected that the user has tapped or shaken the device 20 once within a predetermined time period, on the basis of a result of measurement by an acceleration sensor or the like built in the device 20, the playback control unit 102 may raise the tempo one notch. In the case where it is detected that the user has tapped or shaken the device 20 twice within a predetermined time period, the playback control unit 102 may lower the tempo one notch.

{1-2-3. Decision Unit 104}

The decision unit 104 decides a processing pattern of processing to be executed in association with content playback from among a plurality of processing patterns, in accordance with playback target content. For example, the decision unit 104 decides a vibration pattern of vibration that the device 20 is caused to produce in association with content playback, from among a plurality of vibration patterns, in accordance with playback target content. Alternatively, the decision unit 104 decides an illumination pattern of illumination that the device 20 is caused to display in association with content playback, from among a plurality of illumination patterns, in accordance with playback target content. Alternatively, the decision unit 104 decides an animation pattern of animation that the device 20 is caused to display in association with content playback, from among a plurality of animation patterns, in accordance with playback target content. Alternatively, the decision unit 104 decides an motion pattern of operation that the device 20 is caused to execute in association with content playback, from among a plurality of motion patterns, in accordance with playback target content.

For example, in the case where playback target content is music, the decision unit 104 decides a processing pattern of processing to be executed, in accordance with the time, genre, part, tempo, or the like of the playback target music. As an example, in regard to the playback target music, information on the basic time, genre (or mood), and currently played part of the music is acquired on the basis of a result of music analysis performed before or during playback. Then, the decision unit 104 decides the processing pattern of the processing to be executed, in accordance with the acquired information on the time, genre, and part and details registered in a processing pattern DB 124 described later.

(1-2-3-1. Processing Pattern DB 124)

The processing pattern DB 124 is, for example, a database that stores a plurality of processing patterns in association with a large category, a medium category, and a small category. Here, the large category is the time of the playback target music, for example. The medium category is the genre of the playback target music, for example. The small category is a playback target part (in the playback target music), for example.

FIG. 5 is an explanatory diagram illustrating a configuration example of the processing pattern DB 124. As illustrated in FIG. 5, for example, times 1240, genres 1242, parts 1244, and patterns 1246 are associated with each other in the processing pattern DB 124. Here, the times 1240 are time types of music that are registered in advance (e.g., triple time, quadruple time, and six-eight time). The genres 1242 are genre types of music that are registered in advance (e.g., jazz, reggae, rock, up-tempo, Latin, and slow ballad). The parts 1244 are part types of music that are registered in advance. Here, the part types may be, for example, types such as Intro, A-melo, B-melo, Sabi, and Interlude, or may be types such as Verse 1, Verse 2, and Chorus. In the patterns 1246, a plurality of processing patterns associated with the relevant time, genre, and part are stored. Here, parameters of the plurality of processing patterns (associated with the relevant time, genre, and part) have different values. Note that the values of the parameters are set in advance within a range of predetermined values such as "1" to "100". Furthermore, the range of the values of the parameters may be set for each part. For example, the range may be set as follows: the range of parameter values when the part is "Verse 1" is "1" to "30", and the range of parameter values when the part is "Verse 2" is "21" to "50".

Decision Example of Processing Pattern

In the example illustrated in FIG. 5, in the case where the playback target music has a time of "quadruple time" and a genre of "Latin" and the playback target part is "Verse 1", the decision unit 104 decides "4-A-a-1" as a processing pattern of processing to be executed when the part of the music is played.

The decision unit 104 basically does not change the large category or the medium category during playback of one tune. Thus, in playback of one tune, consistency of executed processing patterns can be ensured. Note that only if it is detected that a change of tone is included in the middle of the tune, the decision unit 104 may change the large category of processing patterns in accordance with the detected change of tone, and decide a new processing pattern in accordance with the changed large category.

In addition, when a great change in the sound pressure of music is detected or when a part transition or a mood transition is detected on the basis of a music analysis result, the decision unit 104 can change the small category of processing patterns as appropriate, and decide a new processing pattern in accordance with the changed small category as appropriate.

The genre of playback target music may be decided uniquely (constantly), or may be decided stochastically for each playback. In the latter case, for example, the decision unit 104 may calculate an evaluation value for individual genres using a predetermined criterion, and decide a genre stochastically on the basis of the calculated evaluation value. According to this decision example, even for the same playback target music, executed processing patterns can sometimes be greatly varied in type. This makes the user feel surprise (or freshness).

Modification Example

The configuration example of the processing pattern DB 124 is not limited to the example illustrated in FIG. 5. For example, the strength of the tempo of music (e.g., no beat, slow, middle, or fast) and/or another category (e.g., Ambient, Beat-in, or Beat-on (Flywheel)) (hereinafter referred to as a beat category) may be associated additionally or alternatively. For example, a processing pattern independent of the beat of music is associated with Ambient. Processing patterns having a clear relationship with the beat are associated with Beat-in and Beat-on (Flywheel). For example, in the case of illumination patterns, an illumination pattern whose hue is changed in a manner independent of the beat of music may be associated with Ambient. Illumination patterns having a strong relationship with the beat (e.g., having different tempos of illumination depending on the beat) may be associated with Beat-in and Beat-on (Flywheel).

Furthermore, types of processing patterns (e.g., a vibration pattern, an illumination pattern, an animation pattern, or a motion pattern) may be associated in the processing pattern DB 124. Alternatively, one processing pattern DB 124 may be provided for each type of processing pattern.

(1-2-3-2. Other Decision Examples)

Image Analysis

Alternatively, in the case where content includes a moving image, the decision unit 104 can decide a processing pattern of processing that the device 20 is caused to execute in association with content playback, from among a plurality of processing patterns, on the basis of an analysis result of the moving image.

State of Device 20

Alternatively, the decision unit 104 can decide a processing pattern of processing that the device 20 is caused to execute in association with content playback, from among a plurality of processing patterns, further on the basis of information on the state of the device 20. Here, the information on the state of the device 20 may include a measurement result of vibration and motion of the device 20, for example. For example, the information on the state of the device 20 may include a result of measurement to find whether the device 20 is being tapped by the user and, if the device 20 is being tapped, a measurement result of the rhythm of the tapping.

Alternatively, the information on the state of the device 20 may include a result of activity recognition of a user carrying the device 20. For example, the information on the state of the device 20 may include a result of recognition that the user carrying the device 20 is feeling rhythm by swinging his/her body, the user is running, or the user is on a train. Note that the activity recognition result of the user is recognized by the information processing apparatus 10 or the like on the basis of a measurement result of vibration and motion of the device 20, for example. The vibration and motion of the device 20 may be measured by a vibration sensor and an acceleration sensor built in the device 20, for example, or may be measured by any of various sensors, such as a camera, placed in a surrounding environment of the device 20 (e.g., a room).

Information on User

Alternatively, the decision unit 104 can decide a processing pattern of processing that the device 20 is caused to execute in association with content playback, from among a plurality of processing patterns, further on the basis of information on a user. Here, the information on the user may include, for example, a measurement result related to the user's body (e.g., a pulse value, a sweat rate, or body temperature) and how the measurement result changes. For example, in the case where it is detected that the user is relaxed, the decision unit 104 can decide a calmer processing pattern. In the case where it is detected that the user is excited or enthusiastic, the decision unit 104 can decide a processing pattern with a faster tempo. Alternatively, in this case, the decision unit 104 may decide a calmer processing pattern for the purpose of relaxing the user.

Alternatively, the information on the user may include a status of the user's account. For example, the status of the user's account includes the number of notifications unchecked by the user (e.g., e-mails that have not been browsed by the user) or phone messages, which are currently accumulated in a predetermined server (not illustrated), the information processing apparatus 10, or the like.

Information on Environment

Alternatively, the decision unit 104 can decide a processing pattern of processing that the device 20 is caused to execute in association with content playback, from among a plurality of processing patterns, further on the basis of information on environment. Here, the information on the environment may include, for example, temperature (indoors and outdoors), humidity (indoors and outdoors), the number of persons in a room, weather, a day of the week, a time slot, or the state of an external apparatus (e.g., smartphone). As an example, the information on the environment may include how a measurement result of the outdoor temperature changes after the start of playback of music by the content playback apparatus 22. The state of the external apparatus may include, for example, the remaining battery of the external apparatus and the number of new notifications to the external apparatus.

(1-2-3-3. Change of Pattern)

In addition, the decision unit 104 changes a processing pattern of processing that the device 20 is caused to execute, in accordance with content playback. For example, when a predetermined number of bars have elapsed from the start timing of the current part, the decision unit 104 decides one of processing patterns other than the current processing pattern, the processing patterns being associated with the same part, as a processing pattern to be newly executed. As an example, first, the decision unit 104 randomly selects a processing pattern whose parameter value is within a predetermined range (e.g., equal to or more than −10 and equal to or less than 10) from the parameter value of the current processing pattern, from among processing patterns other than the current processing pattern, the processing patterns being associated with the same part. Then, the decision unit 104 decides the selected processing pattern as a processing pattern to be newly executed.

When the current part transitions to the next part, the decision unit 104 decides one of a plurality of processing patterns associated with the next part as a processing pattern to be newly executed. For example, first, the decision unit 104 randomly selects a processing pattern whose parameter value is within a predetermined range (e.g., −15 or less or 15 or more) from the parameter value of the current processing pattern, from among a plurality of processing patterns associated with the next part. Then, the decision unit 104 decides the selected processing pattern as a processing pattern to be newly executed.

In the case where the BPM of music can be acquired in advance before starting playback of the music, the decision unit 104 can decide a pattern corresponding to the acquired BPM as a processing pattern to be executed immediately before starting playback of the music. This makes it possible to produce vibration of a vibration pattern such as "one, two, three", for example, immediately before starting playback of the music, and start playback of the music at the end of the vibration.

In the case where two or more tunes are played consecutively, the decision unit 104 can decide a processing pattern of processing to be executed when the tune is switched, on the basis of detection of switching between tunes. For example, when the tune is switched, the decision unit 104 may decide a processing pattern that naturally connects the tunes before and after the switching as the processing pattern to be executed, or may decide a processing pattern that greatly changes the impression as the processing pattern to be executed.

{1-2-4. Processing Control Unit 106}

(1-2-4-1. Control of Processing)

The processing control unit 106 causes the device 20 to execute processing corresponding to the processing pattern decided by the decision unit 104. For example, the processing control unit 106 causes the device 20 to produce vibration corresponding to the vibration pattern decided by the decision unit 104, causes the device 20 to display illumination corresponding to the decided illumination pattern, causes the device 20 to display a moving image corresponding to the decided animation pattern, or causes the device 20 to execute operation corresponding to the decided motion pattern.

More specifically, the processing control unit 106 first generates processing control information for causing the device 20 to execute processing corresponding to the processing pattern decided by the decision unit 104. Then, the processing control unit 106 causes the communication unit 120 to transmit the generated processing control information to the device 20. Thus, the device 20 executes the relevant processing in accordance with the received processing control information.

Control Over Plurality of Devices 20

The processing control unit 106 can cause a plurality of devices 20 to execute processing corresponding to the processing pattern decided by the decision unit 104. For example, in the case where the processing pattern includes a plurality of sub-patterns, the processing control unit 106 may cause different devices 20 to execute processing corresponding to the plurality of sub-patterns.

Here, the above function is described in more detail with reference to FIG. 6. The example illustrated in FIG. 6 assumes a scene where a user 2 wears a vibration device 20aF near the center of the front side of the breast (breast bone), and wears a vibration device 20aR near the center of the rear side of the breast (backbone). It is assumed that a vibration pattern is divided into two sub-patterns of "front channel" and "rear channel" in advance. For example, in the case where the vibration pattern is "Don, Pon, Don, Don, Pon", "Don, Don, Don" included in the vibration pattern may be set as the front channel, and "Pon, Pon" included in the vibration pattern may be set as the rear channel.

Figure 6:
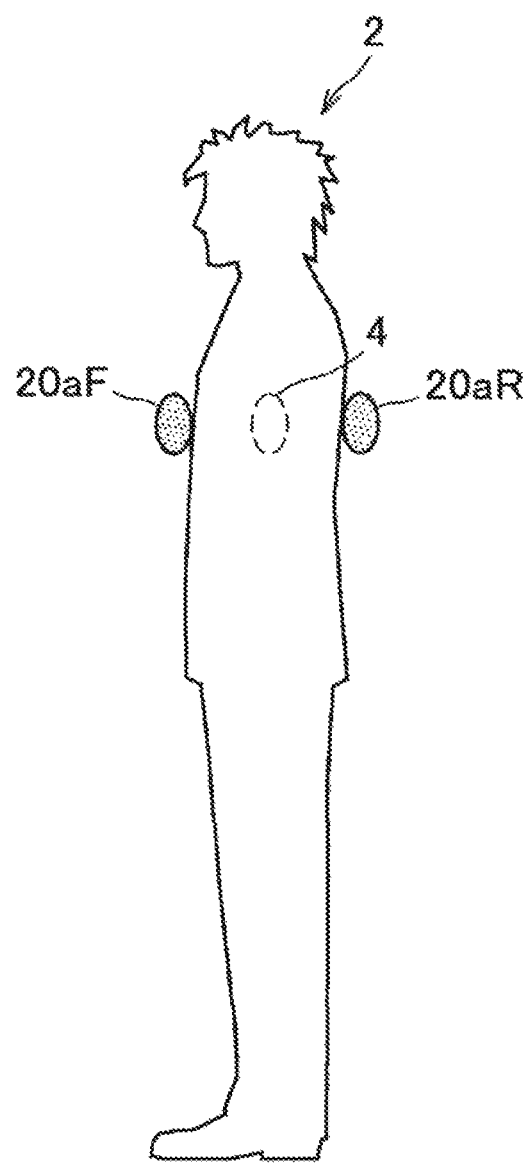
FIG. 6 is an explanatory diagram illustrating a user wearing two vibration devices 20.

In the example illustrated in FIG. 6, the processing control unit 106 causes the front-side vibration device 20aF to produce vibration corresponding to the front channel, and causes the rear-side vibration device 20aR to produce vibration corresponding to the rear channel. According to this control example, the user can experience a feeling that his/her body is swung back and forth. Moreover, the user can experience a feeling that the source of the vibration is in an interior 4 of the body.

If the user wears one vibration device 20a on each of the left and right sides of the body, vibration only propagates on the surface, which limits the spread of experience. In contrast, when the user wears one vibration device 20a near the breast bone and one vibration device 20a near the backbone so that the body is sandwiched from the front and the rear, as illustrated in FIG. 6, a sense of the produced vibration echoing in the interior 4 of the body can be obtained. This increases the spread of experience that the user can obtain.

As another control example, the processing control unit 106 may cause both the front-side vibration device 20aF and the rear-side vibration device 20aR to concurrently produce vibration corresponding to one vibration pattern. Furthermore, in this case, the processing control unit 106 may perform control to gradually weaken the magnitude of the vibration produced from the vibration device 20aF from 100% to 0%, and gradually strengthen the magnitude of the vibration produced from the vibration device 20aR from 0% to 100%. Alternatively, the processing control unit 106 may perform control to gradually strengthen the magnitude of the vibration produced from the vibration device 20aF, and gradually weaken the magnitude of the vibration produced from the vibration device 20aR.

Alternatively, the processing control unit 106 may cause the front-side vibration device 20aF and the rear-side vibration device 20aR to produce vibration corresponding to one vibration pattern, with a difference in start timing of vibration between the front-side vibration device 20aF and the rear-side vibration device 20aR. According to these control examples, the user can experience a feeling that the produced vibration passes through the body.

Modification Example

As a modification example, the processing control unit 106 may cause the plurality of devices 20 to execute processing corresponding to different types of musical instruments or different scales.

Alternatively, the processing control unit 106 may control the plurality of devices 20 in a manner that the intensity of the produced vibration, the number of vibrations, or the speed of vibration differs depending on a positional relation (e.g., distance) between the plurality of devices 20, the strength of relationship, etc.

Alternatively, the processing control unit 106 can cause each device 20 to execute processing corresponding to a different processing pattern. For example, the processing control unit 106 may cause the device 20a to execute processing corresponding to a processing pattern with a genre of "rock", and cause the device 20b to execute processing corresponding to a processing pattern with a genre of "jazz".

Alternatively, the processing control unit 106 can perform control in a manner that each device 20 outputs different information. For example, in the case where a vibration pattern and an illumination pattern are decided concurrently by the decision unit 104, the processing control unit 106 may cause the device 20a to produce vibration corresponding to part of the vibration pattern, cause the device 20b to produce vibration corresponding to the rest of the vibration pattern, and cause the device 20c to display illumination corresponding to the illumination pattern.

Control Over Plurality of Modules

As another modification example, in the case where a plurality of vibration modules are mounted on the device 20, the processing control unit 106 can control the device 20 in a manner that each vibration module produces different vibration. For example, in the case where one vibration pattern includes a plurality of sub-patterns, the processing control unit 106 may cause different vibration modules to produce vibration corresponding to the plurality of sub-patterns. Alternatively, the processing control unit 106 may cause the vibration modules to produce vibration corresponding to one vibration pattern with time difference. Note that vibration modules mounted on one device 20 may all have the same characteristics or may have different characteristics.

(1-2-4-2. Dynamic Change of Processing)

Adjustment of Tempo of Processing Pattern

The processing control unit 106 can dynamically adjust processing itself corresponding to the processing pattern decided by the decision unit 104, in accordance with music being played. For example, by acquiring the BPM of playback target music by musical analysis or the like, the processing control unit 106 may adjust the BPM of the executed processing pattern in a manner that the BPM of the executed processing pattern coincides with the BPM of the music being played.

The processing control unit 106 may adjust the BPM of the processing pattern on the basis of a result of real-time analysis of the music being played. According to this adjustment example, the real-time analysis enables adjustment of the BPM of the decided processing pattern even for an arbitrary type of music or an arbitrary playback method (e.g., streaming playback).

Alternatively, in the case where a log of past analysis results for each tune is prepared, the processing control unit 106 may adjust the BPM of the processing pattern by predicting a change in BPM related to the playback target music by using the log. Furthermore, the processing control unit 106 can predict a change in BPM by using the log in combination with a result of real-time analysis of the music being played. According to these adjustment examples, occurrence of time lag between the music being played and the executed processing pattern can be prevented as much as possible. In other words, the followability of the executed processing pattern to the music being played can be improved.

Furthermore, the processing control unit 106 can specify beforehand a change of tone, a silent section, etc. in the middle of the tune on the basis of the log. Then, the processing control unit 106 can adjust the processing pattern or switch to another processing pattern in accordance with the specified change of tone or silent section.

Stop of Processing Pattern

Alternatively, in the case where playback target music is a tune in which the end of the tune fades out, the processing control unit 106 may control the device 20 in a manner that processing corresponding to a processing pattern being executed fades out, or may cause the device 20 to repeat (loop) the execution of the processing, at the end of the tune. Alternatively, in the case where playback target music is a tune in which the end of the tune stops suddenly, the processing control unit 106 may control the device 20 in a manner that processing corresponding to a processing pattern being executed stops suddenly in accordance with music being played.

Alternatively, in the case where a place at which silence or a volume of a predetermined threshold value or less continues for a predetermined time period or more is detected in the middle of playback target music, the processing control unit 106 may control the device 20 in a manner that processing corresponding to a processing pattern being executed stops suddenly at the detected place.

Reflection of Clapping

Alternatively, in the case where it is detected that clapping is included in the middle of playback target music, the processing control unit 106 may dynamically change processing corresponding to a processing pattern being executed, in accordance with the detected clapping. Alternatively, in this case, the processing control unit 106 may cause the device 20 to execute processing corresponding to a dedicated processing pattern for clapping.

(1-2-4-3. Other Adjustment Examples)

Image Analysis

Alternatively, in the case where content includes a moving image, the processing control unit 106 can dynamically change processing corresponding to the decided processing pattern, in accordance with an analysis result of the moving image.

Playback Situation of Content

Alternatively, the processing control unit 106 can dynamically change processing corresponding to the decided processing pattern, in accordance with the playback situation of content. For example, the processing control unit 106 may dynamically change processing corresponding to the decided processing pattern, in accordance with the length of consecutive playback time of currently played content (or consecutive playback time of a plurality of pieces of content that have been played). As an example, the processing control unit 106 may cause the device 20 to execute special processing (e.g., producing special vibration, displaying special illumination or animation, or special operation) at each elapse of a predetermined time period (e.g., ten minutes or an hour) of consecutive playback time. This enables a user to know how much time has elapsed from the start of use of content. Alternatively, when a predetermined time period of consecutive playback time elapses, the processing control unit 106 may cause the device 20 to interrupt processing being executed, or cause the device 20 to output information (e.g., text, an image, or audio) encouraging an intermission.

State of Device 20

Alternatively, the processing control unit 106 can dynamically change processing corresponding to the decided processing pattern, further in accordance with information on the state of the device 20, information on a user, and/or information on environment. Note that details of information on the state of the device 20, information on a user, and information on environment may be similar to those in the above description.

For example, in the case where it is detected that the user is tapping his/her foot, the processing control unit 106 may reflect the detected tapping on processing corresponding to the decided processing pattern. Alternatively, the processing control unit 106 may change the pace of vibration or the strength of vibration corresponding to the decided vibration pattern, in accordance with an activity recognition result of the user. For example, in the case where it is detected that the user is on a train, the processing control unit 106 may cause vibration corresponding to the decided vibration pattern to be produced more weakly.

Alternatively, in the case where the amount of notifications to an external device or the amount of notifications to the user's account is a predetermined threshold value or more, the information processing apparatus 10 may cause the device 20 or the content playback apparatus 22 to output a predetermined notification (audio, display, or vibration) in the form of being mixed in the beat of music being played. According to this output example, it is possible to notify the user that a certain amount or more of notifications are accumulated, without giving an impression of suddenness to the user during use of content. In the case where the amount of notifications to an external device or the amount of notifications to the user's account is less than the predetermined threshold value, the information processing apparatus 10 can perform control so as not to notify the user. Thus, a hindrance to the use of content can be prevented in regard to a case where there seems to be no problem even if the user is not notified.

{1-2-5. Communication Unit 120}

The communication unit 120 transmits and receives information to/from another apparatus. For example, the communication unit 120 is controlled by the playback control unit 102 to transmit playback control information to the content playback apparatus 22. In addition, the communication unit 120 is controlled by the processing control unit 106 to transmit processing control information to the device 20. Alternatively, the communication unit 120 receives results of measurement by various sensors from the device 20.

{1-2-6. Storage Unit 122}

The storage unit 122 stores various data of the processing pattern DB 124, for example, and various types of software.

The configuration of the information processing apparatus 10 according to the first embodiment is not limited to the example described above. For example, the processing pattern DB 124 may be stored in an external apparatus (not illustrated) that is able to communicate with the information processing apparatus 10, instead of being stored in the storage unit 122.

<1-3. Usage Examples>

The configuration of the first embodiment has been described. Next, usage examples of the first embodiment are described. Described below are four usage examples (examples in which the information processing apparatus 10 controls production of vibration, display of illumination, display of animation, and operation of the device 20).

{1-3-1. Usage Example 1: Control of Vibration}

Described first is an example in which the information processing apparatus 10 controls production of vibration. For example, the information processing apparatus 10 decides a vibration pattern in accordance with playback target content, and causes the device 20 to produce vibration corresponding to the decided vibration pattern. More specifically, the decision unit 104 of the information processing apparatus 10 decides, in accordance with the time, genre, tempo, part, and the like of playback target music, a vibration pattern to be executed when the relevant music is played, from among a plurality of vibration patterns registered in the processing pattern DB 124. Note that when a change of tone is detected and when the part transitions, for example, the decision unit 104 re-decides the vibration pattern as appropriate.

Then, the playback control unit 102 causes the content playback apparatus 22 to start playback of playback target content. Concurrently, the processing control unit 106 causes the device 20 to produce vibration corresponding to the vibration pattern decided by the decision unit 104. On this occasion, the processing control unit 106 dynamically changes the strength, tempo, frequency band, or the like of the produced vibration on the basis of a predetermined criterion.

For example, the processing control unit 106 controls the produced vibration in a manner that the frequency band of the produced vibration falls within a range (e.g., 60 Hz to 300 Hz) of a band of vibration that is easy for a human to feel. Alternatively, the processing control unit 106 may cause the frequency band of the produced vibration to gradually transition with elapse of time. For example, assume that a vibration pattern of "strong vibration at 80 Hz and weaker vibration at 150 Hz" is decided at the start of content playback. In this case, at each elapse of a predetermined time period from the start of content playback, the processing control unit 106 may shift the phase of the vibration pattern by 20 Hz as appropriate. For example, when a predetermined time period elapses from the start of content playback, the processing control unit 106 causes the device 20 to produce vibration corresponding to a pattern of "strong vibration at 100 Hz and weaker vibration at 170 Hz".

Alternatively, the processing control unit 106 may change the frequency band of the vibration produced by the device 20 with elapse of time, in accordance with some type of scale, such as the scale of playback target music. According to this control example, a scale can be expressed by production of vibration, and thus the user can experience a feeling that music can be felt by touch.

As a modification example, during production of vibration by the device 20, the processing control unit 106 may change processing that the device 20 is caused to execute, in response to detection of user manipulation on the device 20. For example, in the case where it is detected that the user taps the device 20 in the same pattern as the vibration pattern of the vibration or strongly shakes the device 20 during production of vibration by the device 20, the processing control unit 106 may change the vibration pattern in accordance with the detected manipulation, or adjust vibration tempo. For example, the pattern in which the user has tapped the device 20 may be recognized on the basis of information of an acceleration sensor or the like. In the case where user manipulation on the device 20 is detected, the processing control unit 106 may change the vibration pattern or the vibration tempo randomly, or may decide the magnitude of change in vibration pattern or the degree of raising and lowering of vibration tempo in accordance with the intensity with which the device 20 has been shaken, for example.

{1-3-2. Usage Example 2: Display Control of Illumination}
(1-3-2-1. Generation of Color Palette)

Described next is an example in which the information processing apparatus 10 controls display of illumination. For example, the information processing apparatus 10 decides an illumination pattern in accordance with playback target content, and causes the device 20 to display (or emit) illumination corresponding to the decided illumination pattern. Here, an illumination pattern is a pattern generated using colors that are set in a color palette generated in advance.

Here, the color palette is configured as a set of gradation palettes generated for respective Main colors, which are reference colors. Each gradation palette is defined by combinations of Main color (corresponding to the gradation palette), gradation colors of the Main color related to brightness, and gradation colors of the Main color related to hue.

Here, a generation example of a color palette is described specifically. For example, first, a predetermined number (e.g., ten types) of basic colors are defined as Basic colors. These Basic colors may be used for, for example, system-related notifications (a notification indicating that the device 20 is being charged, or a notification indicating that pairing of Bluetooth (registered trademark) is being performed). The Basic colors are not used for illumination patterns in principle.

Subsequently, for example, intermediate colors between adjacent Basic colors in terms of hue are defined as Main colors serving as reference colors in the color palette. Then, gradation colors between adjacent Main colors and gradation colors obtained by changing the brightness of Main colors are obtained, and these gradation colors are further defined as colors used in the color palette.

Figure 7:
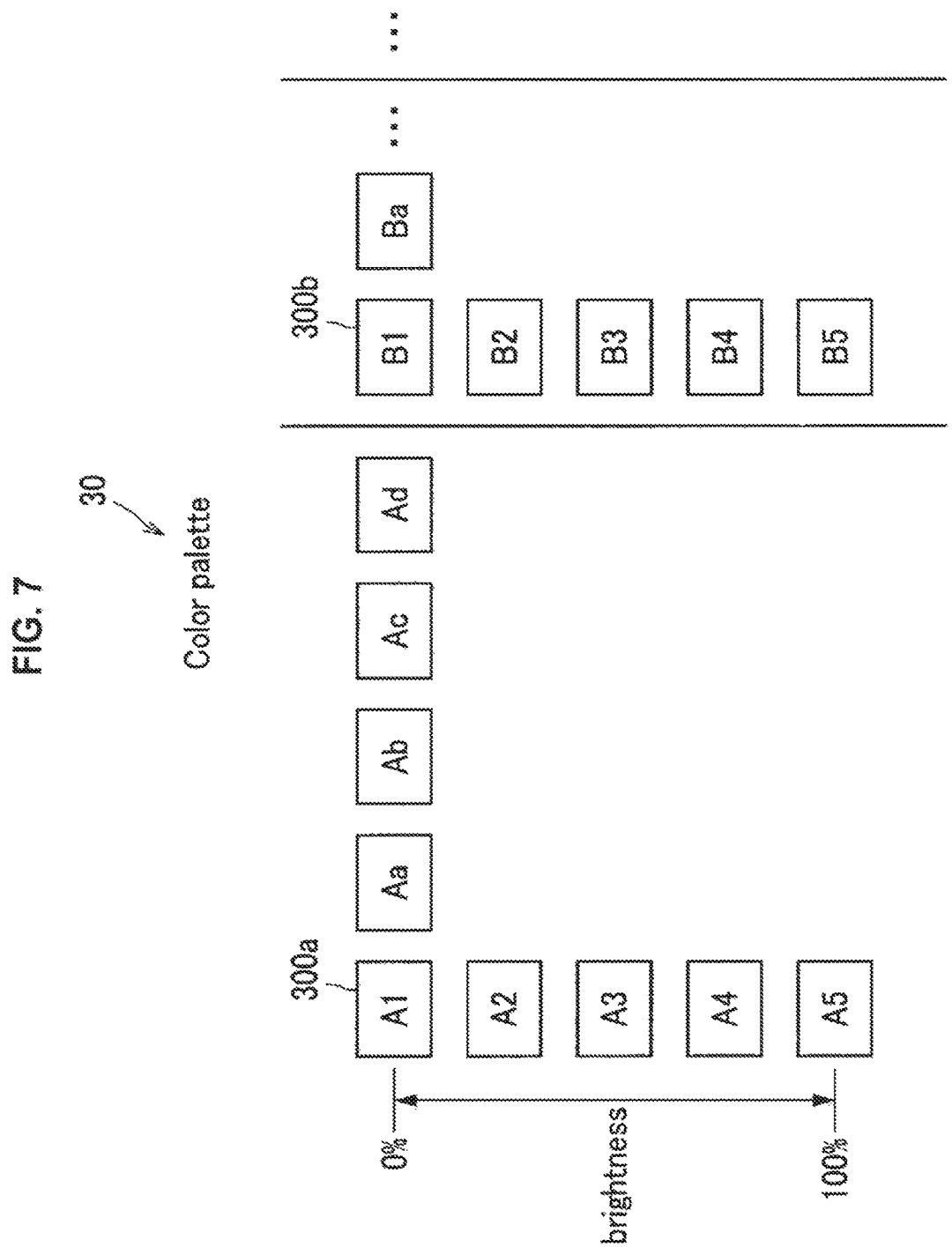
FIG. 7 is an explanatory diagram illustrating a configuration example of a color palette according to the first embodiment.

FIG. 7 is an explanatory diagram illustrating an example of a color palette (a color palette 30). Note that the example illustrated in FIG. 7 is based on the premise that a color "A1" 300a and a color "B1" 300b are defined as Main colors. As illustrated in FIG. 7, for example, a predetermined number (e.g., three) of colors with equal gradations between the color "A1" and a color "A5" obtained by maximizing the brightness of the color "A1" 300a are defined as gradation colors of "A1" related to brightness ("A2", "A3", and "A4"). Similarly, a predetermined number (e.g., four) of colors with equal gradations between the color "A1" and the color "B1" are defined as gradation colors of "A1" related to hue ("Aa", "Ab", "Ac", and "Ad"). Then, combinations of the color "A1", gradation colors of "A1" related to brightness, and gradation colors of "A1" related to hue are defined as a gradation palette of the color "A1". This work is performed for all the Main colors; thus, the color palette 30 is generated.

(1-3-2-2. Generation of Illumination Pattern)

Figure 8:
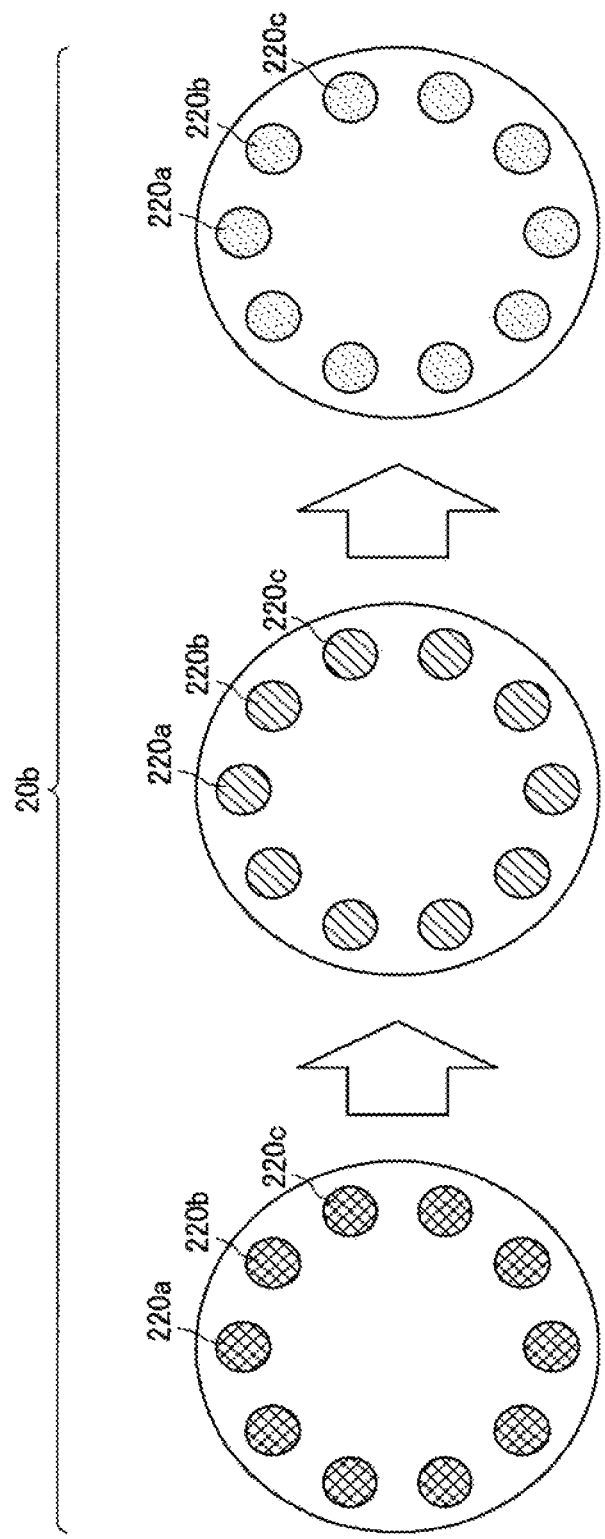
FIG. 8 is an explanatory diagram illustrating an example of an illumination pattern.
Figure 9:
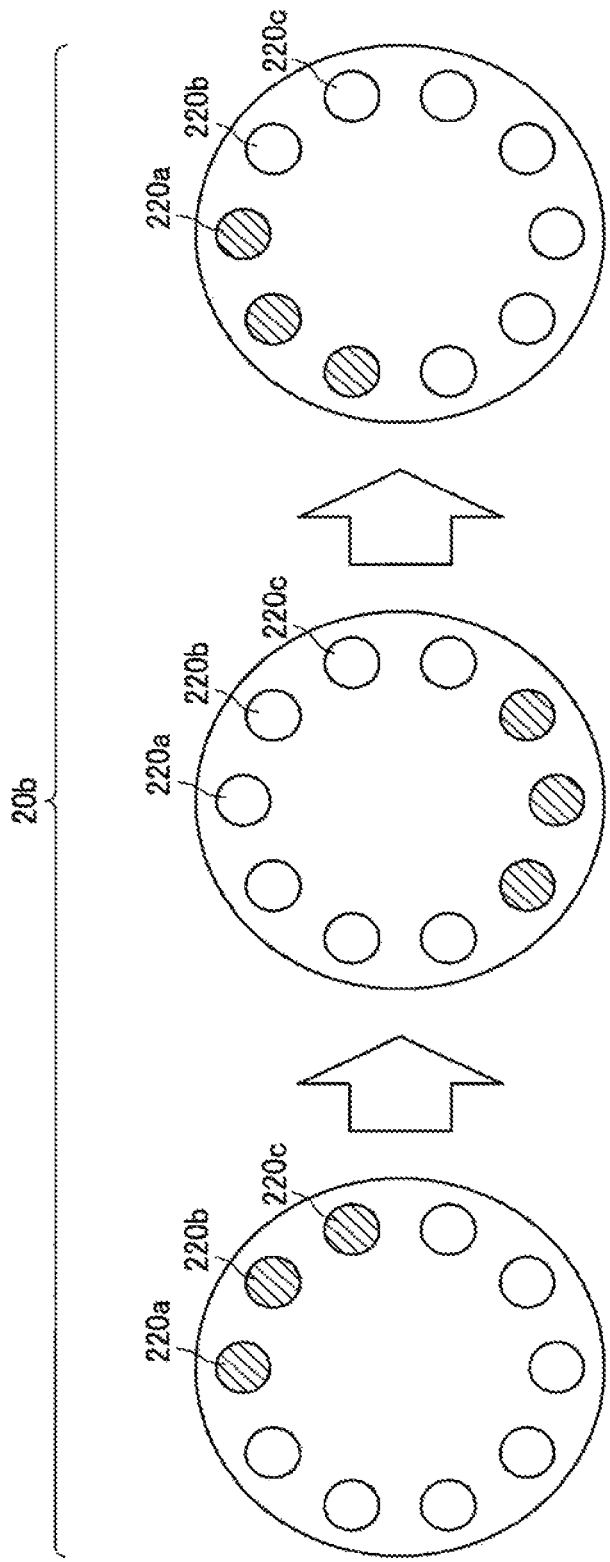
FIG. 9 is an explanatory diagram illustrating an example of an illumination pattern.

Individual illumination patterns may be generated as, for example, a pattern of illumination using only colors that are included in one gradation palette in the color palette. Here, specific examples of illumination patterns are described with reference to FIGS. 8 and 9. Note that FIGS. 8 and 9 illustrate examples in which the device 20 includes a plurality of LEDs 220, and the plurality of LEDs 220 are caused to emit light to display an illumination pattern. For example, as illustrated in FIG. 8, the illumination pattern may be a pattern in which the brightness and/or hue of a color emitted by all of the plurality of LEDs 220 undergoes gradation with elapse of time in accordance with a gradation palette corresponding to the illumination pattern. Alternatively, as illustrated in FIG. 9, the illumination pattern may be a pattern in which an LED 220 group that is caused to emit light, among the plurality of LEDs 220 included in the device 20, is shifted with elapse of time in a manner that output light rotates clockwise or counterclockwise, for example, on the device 20b.

As described above, illumination patterns may be categorized (into small categories) by part (in the processing pattern DB 124). The hue of the Main color (of a plurality of illumination patterns) associated with a part of "Intro" may be set to be apart from the hue of the Main color (of a plurality of illumination patterns) associated with a part of "A-melo" by approximately three. Thus, when a part being played transitions from "Intro" to "A-melo", the information processing apparatus 10 can cause the device 20 to display an illumination pattern with a greatly different hue. This enables a rendering that has regularity and gives a stronger impression to a user, when the part is switched. Without being limited to the case of a part transition, also in the case where playback target music itself is switched or in the case where music being played undergoes a change of tone, the information processing apparatus 10 can switch the illumination pattern in a manner that hues of Main colors of illumination patterns are apart from each other by approximately three.

The medium category associated with illumination patterns (in the processing pattern DB 124) may be the genre of playback target music, or may be a beat category. In the latter case, an illumination pattern when the category is "Beat-on (Flywheel)" may be set in a manner that the amount of change in hue or brightness or the speed of change is greater than that of an illumination pattern when the category is "Beat-in", for example.

(1-3-2-3. Change Example of Illumination)

The processing control unit 106 of the information processing apparatus 10 can dynamically change the tempo of illumination corresponding to the decided illumination pattern, in accordance with the beat of music being played. For example, in the case where the decided illumination pattern is a pattern of rotating illumination and the beat of music being played is set like "Ton, Ton, Ton, . . . ", the processing control unit 106 may cause illumination to be displayed in a tempo that makes the illumination rotate for each "Ton". In the case where the medium category is set to the beat category, the processing control unit 106 may change the tempo of an illumination pattern in accordance with the beat of music being played, only if the category is Beat-in or Beat-on (Flywheel), for example.

Even for the same illumination pattern (and tempo), the processing control unit 106 may dynamically change (e.g., limit) the brightness or hue of illumination in accordance with the beat or sound pressure of music being played, for example.

{1-3-3. Usage Example 3: Display Control of Animation}
(1-3-3-1. Animation Pattern)

Described next is an example in which the information processing apparatus 10 controls display of animation. For example, the information processing apparatus 10 decides an animation pattern in accordance with playback target content, and causes the device 20 to display animation corresponding to the decided animation pattern. Here, an animation pattern may be generated as, for example, animation of a dancer dancing (e.g., one dance sequence). FIG. 10 is an explanatory diagram illustrating an example of a frame image (a frame image 320) included in an animation pattern. The animation pattern may be configured with a plurality of frame images 320.

The medium category associated with animation patterns (in the processing pattern DB 124) may be the genre of playback target music, may be a beat category, or may be the genre of dance, such as hip-hop dance or tap dance.

(1-3-3-2. Change Example of Animation)

The processing control unit 106 of the information processing apparatus 10 can dynamically change the tempo of animation corresponding to the decided animation pattern, in accordance with the beat of music being played. Moreover, even for the same animation pattern (and tempo), the processing control unit 106 may dynamically change the display color of animation in accordance with the beat or sound pressure of music being played, for example.

As a modification example, the processing control unit 106 may dynamically change the display of animation by combining a plurality of animation patterns decided by the decision unit 104 and/or a plurality of colors, in synchronization with the tempo of music being played. Thus, still another expression can be presented to the user.

{1-3-4. Usage Example 4: Control of Motion}
(1-3-4-1. Motion Pattern)

Figure 11:
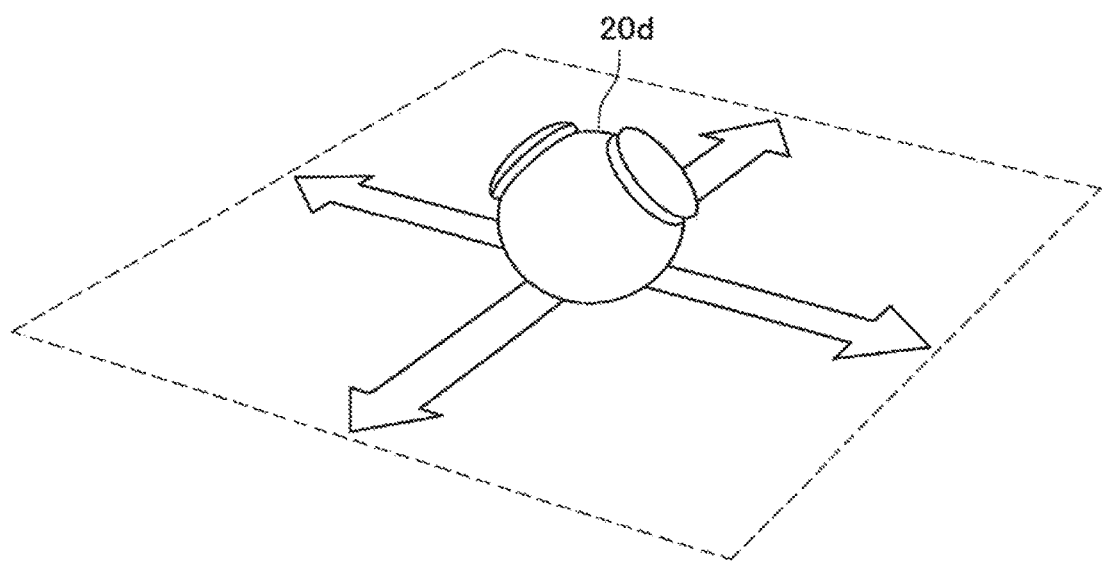
FIG. 11 is an explanatory diagram illustrating an example of a motion included in a motion pattern.

Described next is an example in which the information processing apparatus 10 controls operation of the device 20. For example, the information processing apparatus 10 decides a motion pattern in accordance with playback target content, and causes the device 20 to execute operation corresponding to the decided motion pattern. Here, a motion pattern may be, for example, a pattern in which the device 20 itself moves (e.g., the device 20 moving on a table as illustrated in FIG. 11). Alternatively, the motion pattern may be a pattern in which a specific area included in the device 20 is moved (e.g., an arm of the device 20 being swung from side to side or rotated). Alternatively, the motion pattern may be a pattern in which the movement of the device 20 itself is combined with the operation of a specific area included in the device 20.

The medium category associated with motion patterns (in the processing pattern DB 124) may be the genre of playback target music, or may be a beat category.

(1-3-4-2. Change Example of Motion)

The processing control unit 106 of the information processing apparatus 10 can dynamically change the tempo of the decided motion pattern, in accordance with the beat of music being played. For example, in the case where the medium category is set to the beat category, the processing control unit 106 may change the tempo of a motion pattern in accordance with the beat of music being played, only if the category is Beat-in or Beat-on (Flywheel), for example.

Moreover, even for the same motion pattern (and tempo), the processing control unit 106 may dynamically change movement distance, movement direction, speed, acceleration, rotation angle, or the like in accordance with the beat or sound pressure of music being played, for example.

As a modification example, in the case where a plurality of motion patterns are decided by the decision unit 104, the processing control unit 106 may combine the plurality of motion patterns in synchronization with the tempo of music being played or while shifting tempo. Thus, still another expression can be presented to the user.

Alternatively, in this case, the processing control unit 106 may cause different devices 20 to execute operation corresponding to the decided plurality of motion patterns. For example, the processing control unit 106 may cause different devices 20 to execute operation corresponding to the decided plurality of motion patterns, in synchronization with the tempo of music being played or while shifting tempo.

<1-4. Operation>

The usage examples of the first embodiment have been described. Next, operation according to the first embodiment is described with reference to FIGS. 12 to 21. Described below is an example in which the device 20 is caused to execute processing such as vibration or animation concurrently with playback of music.

{1-4-1. Overall Flow of Operation}

Figure 12:
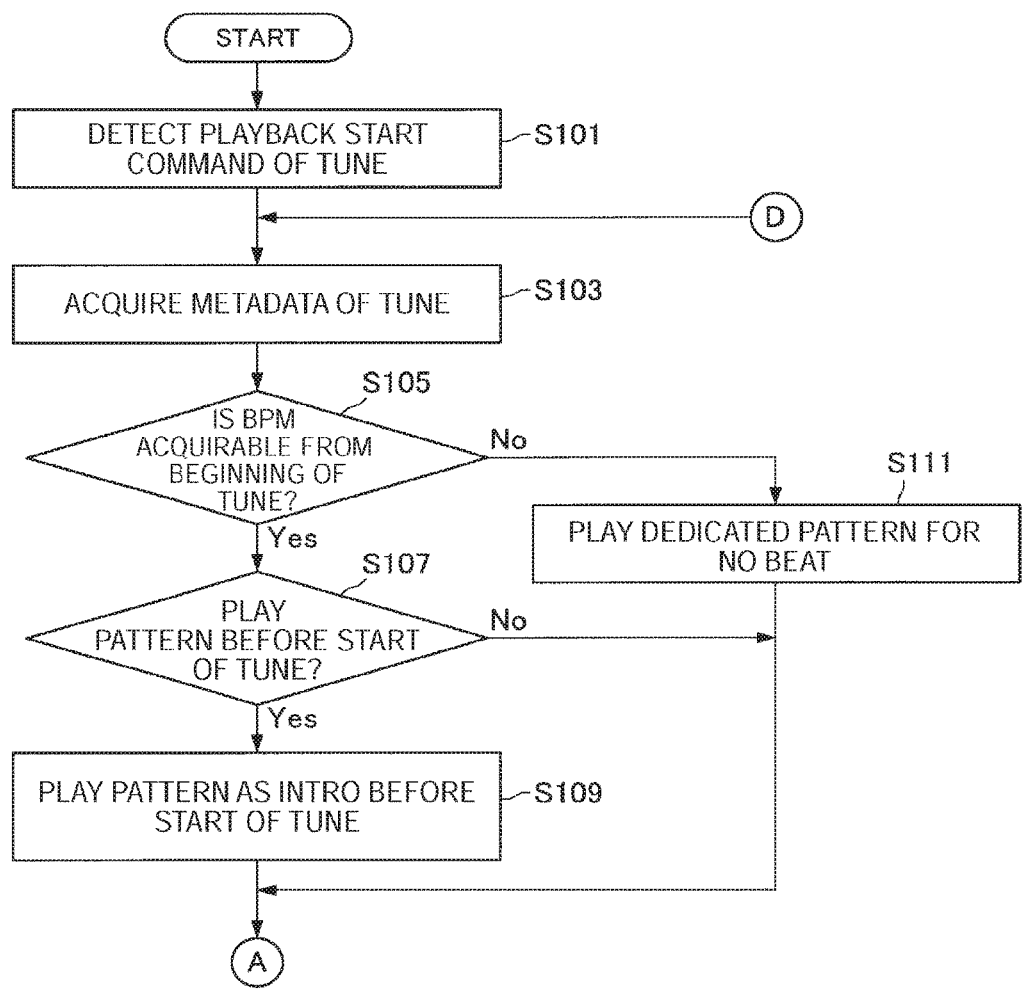
FIG. 12 is a flowchart illustrating part of an operation example according to the first embodiment.

FIGS. 12 to 15 are flowcharts illustrating the overall flow of the operation according to the first embodiment. As illustrated in FIG. 12, first, a user inputs a playback start command for starting playback of music to a predetermined input apparatus (not illustrated), for example. Then, the information processing apparatus 10 receives, from the input apparatus, a notification indicating that the playback start command has been input (S101).

After that, the playback control unit 102 decides music corresponding to the input playback start command as playback target music. Then, the playback control unit 102 acquires metadata of the playback target music from a predetermined server (not illustrated) or the storage unit 122 (S103).

After that, the decision unit 104 determines whether BPM is acquirable from the beginning of the relevant music, on the basis of the acquired metadata (S105). In the case where BPM is acquirable from the beginning of the relevant music (S105: Yes), next, the decision unit 104 determines whether to cause the device 20 to execute a processing pattern before starting playback of the relevant music, on the basis of various types of setting information, for example (S107). In the case where it is determined that the device 20 is to be caused to execute a processing pattern before starting playback of the relevant music (S107: Yes), the processing control unit 106 causes the device 20 to execute processing corresponding to a predetermined processing pattern as Intro, before playback of the relevant music is started (S109). Then, the information processing apparatus 10 performs processing of S121 described later. In the case where it is determined that the device 20 is not to be caused to execute a processing pattern before starting playback of the relevant music (S107: No), the information processing apparatus 10 performs processing of S121 described later.

In the case where BPM of the beginning of the relevant music is not acquirable in S105 (S105: No), the processing control unit 106 causes the device 20 to execute processing corresponding to a dedicated pattern for no beat (S111). Then, the information processing apparatus 10 performs processing of S121 described later.

Figure 13:
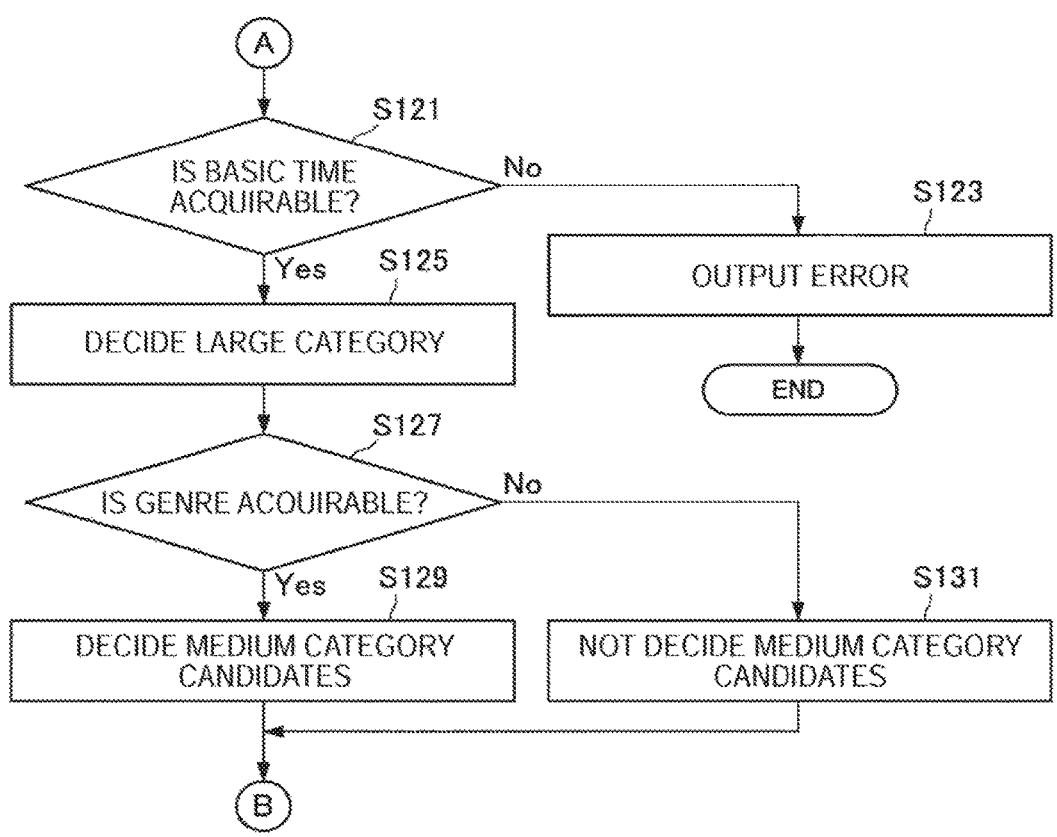
FIG. 13 is a flowchart illustrating part of an operation example according to the first embodiment.

Here, the operation of S121 and subsequent steps is described with reference to FIG. 13. As illustrated in FIG. 13, the decision unit 104 determines whether the basic time is acquirable in regard to the relevant music, on the basis of the acquired metadata, for example (S121). In the case where the basic time is not acquirable in regard to the relevant music (S121: No), the processing control unit 106 causes the device 20, for example, to output audio or display of an error (S123). Then, the information processing apparatus 10 ends this operation.

In the case where the basic time is acquirable in regard to the relevant music (S121: Yes), the decision unit 104 decides the acquired basic time as a large category (S125). Subsequently, the decision unit 104 determines whether the genre of the relevant music is acquirable on the basis of the acquired metadata, for example (S127). In the case where the genre of the relevant music is acquirable (S127: Yes), the decision unit 104 decides the acquired one or more genres etc. as medium category candidates (S129). Then, the information processing apparatus 10 performs processing of S141 described later.

In the case where the genre of the relevant music is not acquirable (S127: No), the decision unit 104 does not decide medium category candidates (S131). Then, the information processing apparatus 10 performs processing of S141 described later.

Figure 14:
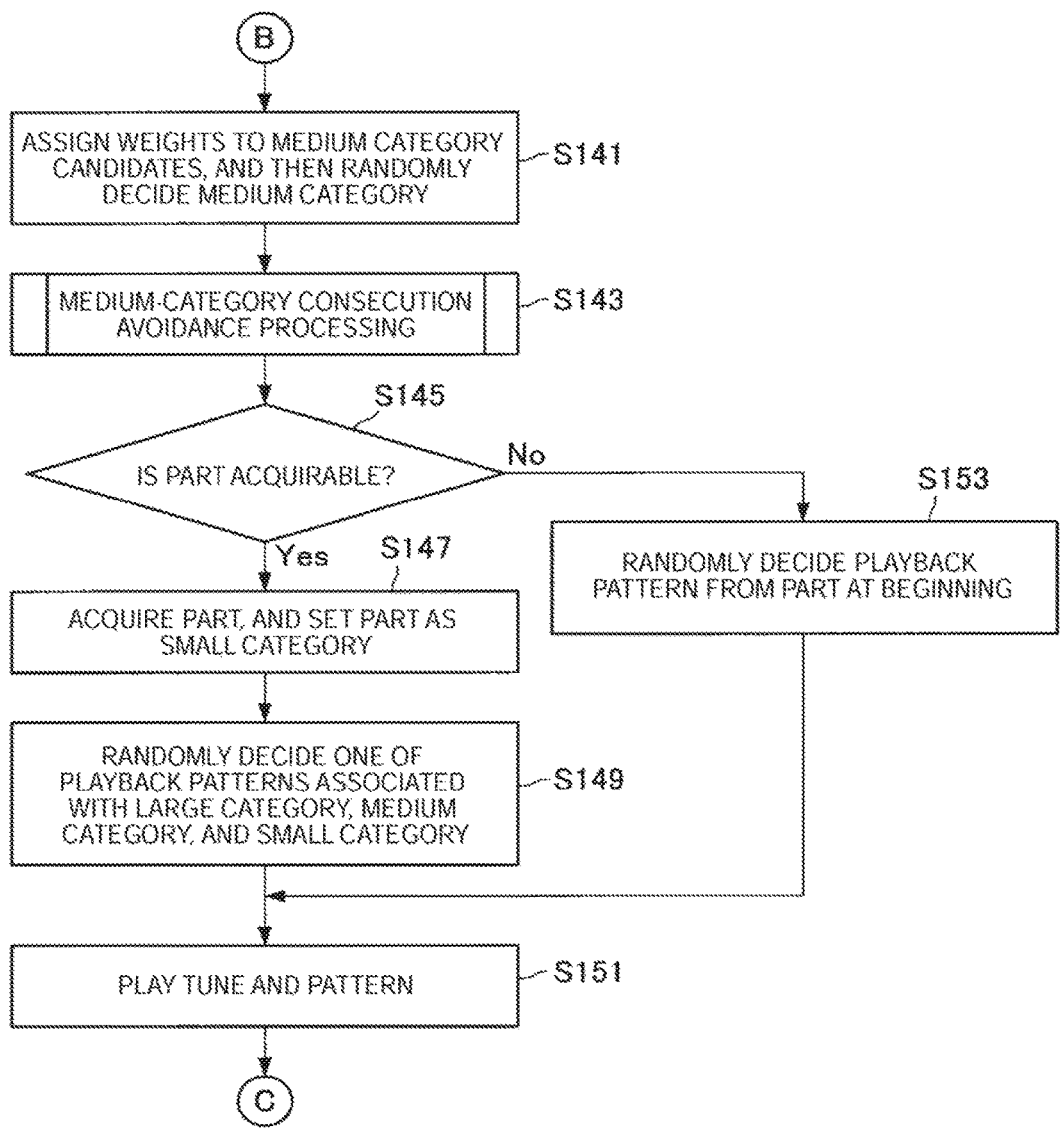
FIG. 14 is a flowchart illustrating part of an operation example according to the first embodiment.

Here, the operation of S141 and subsequent steps is described with reference to FIG. 14. As illustrated in FIG. 14, in S141, the decision unit 104 calculates an evaluation value using a predetermined criterion for each of the decided one or more medium category candidates, and decides a medium category stochastically on the basis of the calculated evaluation value (S141).

Subsequently, the information processing apparatus 10 executes "medium-category consecution avoidance processing" described later (S143).

After that, the decision unit 104 determines whether a playback target part is acquirable (S145). In the case where a playback target part is acquirable (S145: Yes), the decision unit 104 acquires the playback target part, and decides the acquired part as a small category (S147). Subsequently, the decision unit 104 randomly decides one of a plurality of processing patterns associated with the decided large category, medium category, and small category in the processing pattern DB 124 as a processing pattern of processing to be executed (S149).

Subsequently, the playback control unit 102 causes the content playback apparatus 22 to start playback of the playback target music (S151). Concurrently, the processing control unit 106 may cause the device 20 to start execution of processing corresponding to the processing pattern decided in S149 or S153 described later. After that, the information processing apparatus 10 executes processing of S161 described later.

In the case where a playback target part is not acquirable (S145: No), the decision unit 104 randomly decides a processing pattern of processing to be executed, from among a plurality of processing patterns associated with a part at the beginning of the relevant music (S153). Then, the information processing apparatus 10 executes the processing of S151 and subsequent steps.

Figure 15:
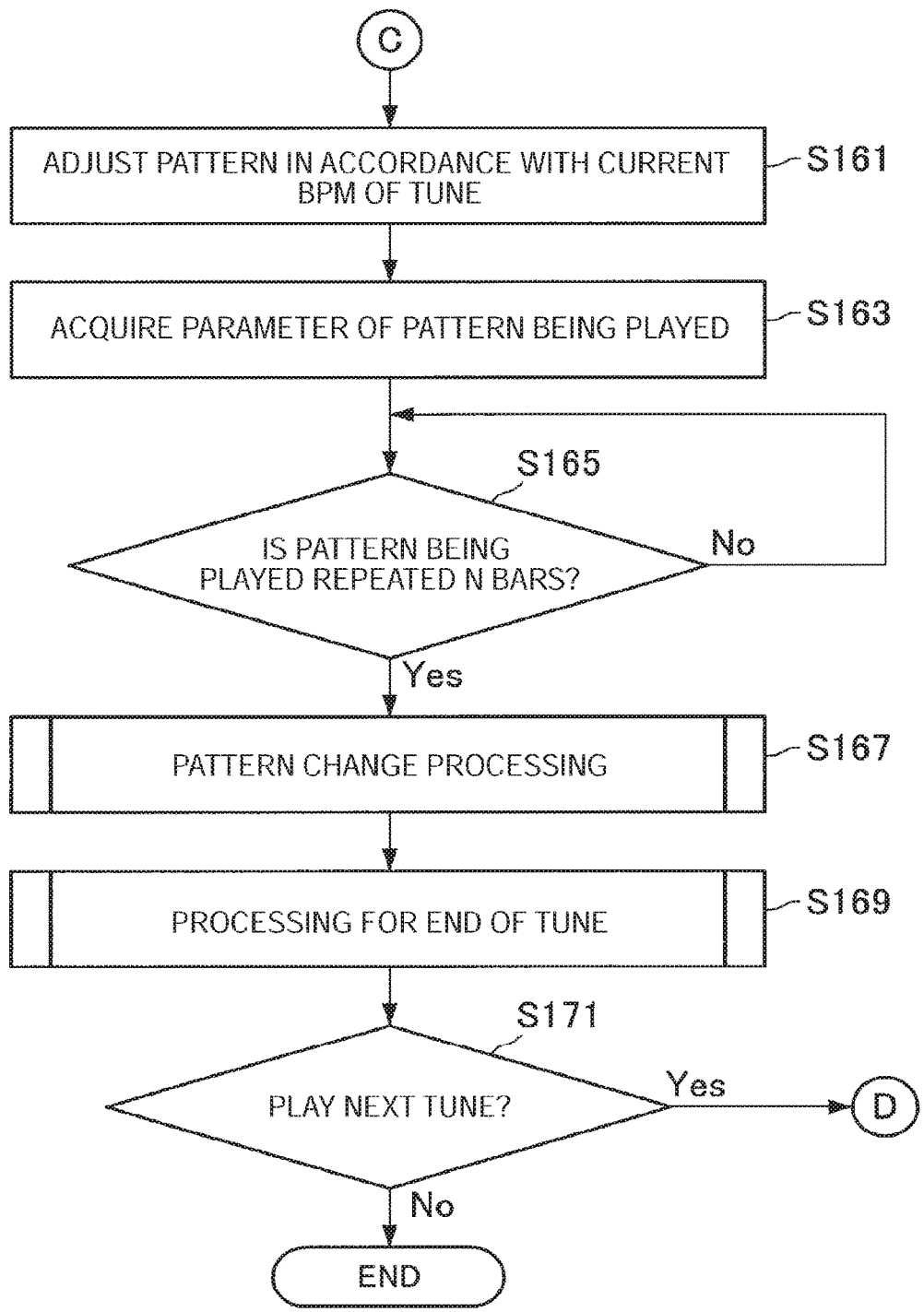
FIG. 15 is a flowchart illustrating part of an operation example according to the first embodiment.

Here, the operation of S161 and subsequent steps is described with reference to FIG. 15. As illustrated in FIG. 15, in S161, the processing control unit 106 dynamically changes the tempo of processing corresponding to the relevant processing pattern, in accordance with the BPM of currently played music, and causes the device 20 to execute the processing in the changed tempo (S161).

Subsequently, the decision unit 104 acquires a parameter value of the relevant processing pattern from the processing pattern DB 124, for example (S163).

After that, the decision unit 104 waits until processing corresponding to the relevant processing pattern is repeated N bars (S165). Then, in the case where the relevant processing is repeated N bars (S165: Yes), the information processing apparatus 10 executes "pattern change processing" described later (S167) After that, the information processing apparatus 10 executes "processing for end of tune" described later (S169).

After that, the playback control unit 102 determines whether to play another tune consecutively on the basis of presence or absence of user input or setting information, for example (S171). In the case where it is determined that another tune is to be played consecutively (S171: Yes), the playback control unit 102 repeats the processing of S103 and subsequent steps. In the case where it is determined that another tune is not to be played (S171: No), the information processing apparatus 10 ends this operation.

{1-4-2. Medium-Category Consecution Avoidance Processing}

Figure 16:
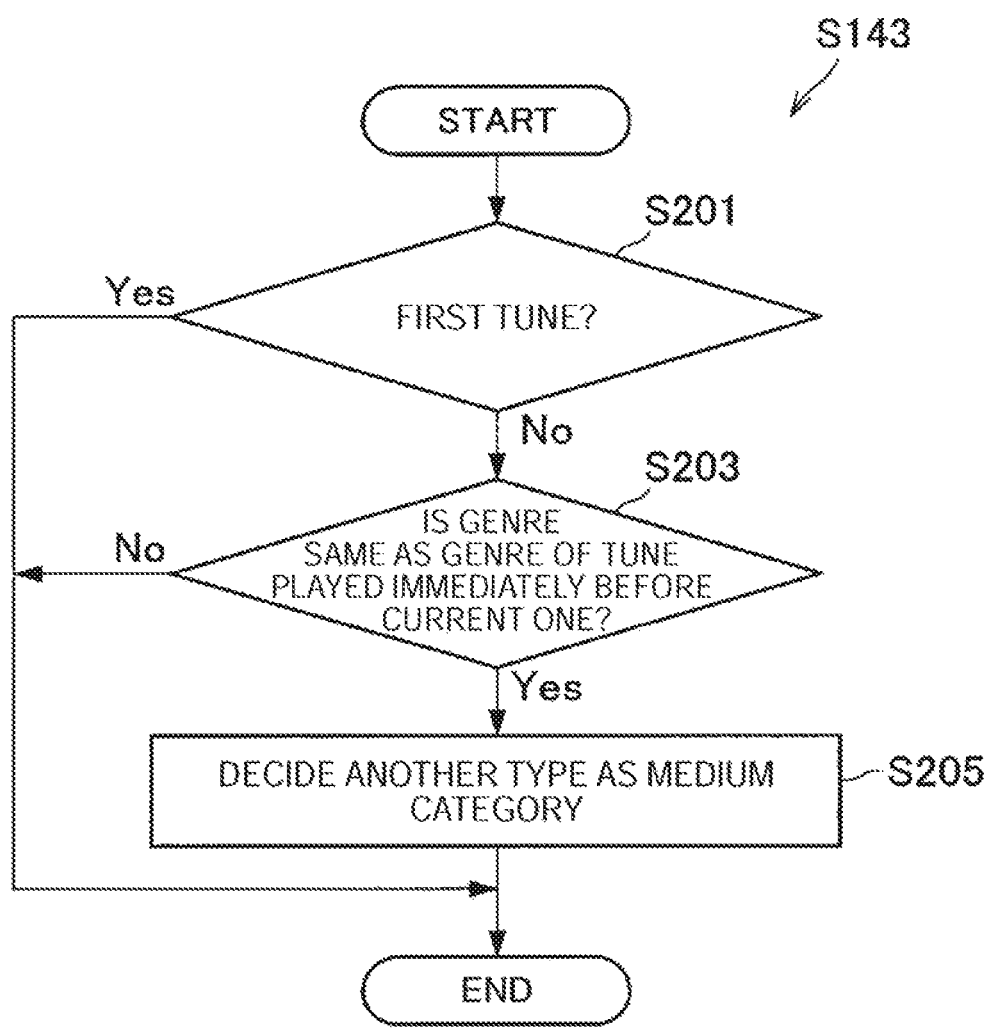
FIG. 16 is a flowchart illustrating the flow of "medium-category consecution avoidance processing" according to the first embodiment.

Next, the flow of "medium-category consecution avoidance processing" in S143 is described with reference to FIG. 16. As illustrated in FIG. 16, first, the decision unit 104 determines whether the current playback target music is the first tune (S201). In the case where it is the first tune (S201: Yes), the "medium-category consecution avoidance processing" ends.

In the case where the current playback target music is the second or subsequent tune (S201: No), the decision unit 104 determines whether the genre of the current playback target music is the same as the genre of the tune played immediately before the current playback target music (S203). In the case where the genre of the current playback target music is the same as the genre of the tune played immediately before the current playback target music (S203: Yes), the decision unit 104 decides a processing pattern different from the previous processing pattern, from among a plurality of processing patterns associated with the genre of the current playback target music (as a processing pattern to be executed this time) (S205). Then, the "medium-category consecution avoidance processing" ends.

In the case where the genre of the current playback target music is different from the genre of the tune played immediately before the current playback target music (S203: No), the "medium-category consecution avoidance processing" ends.

{1-4-3. Pattern Change Processing}

Figure 17:
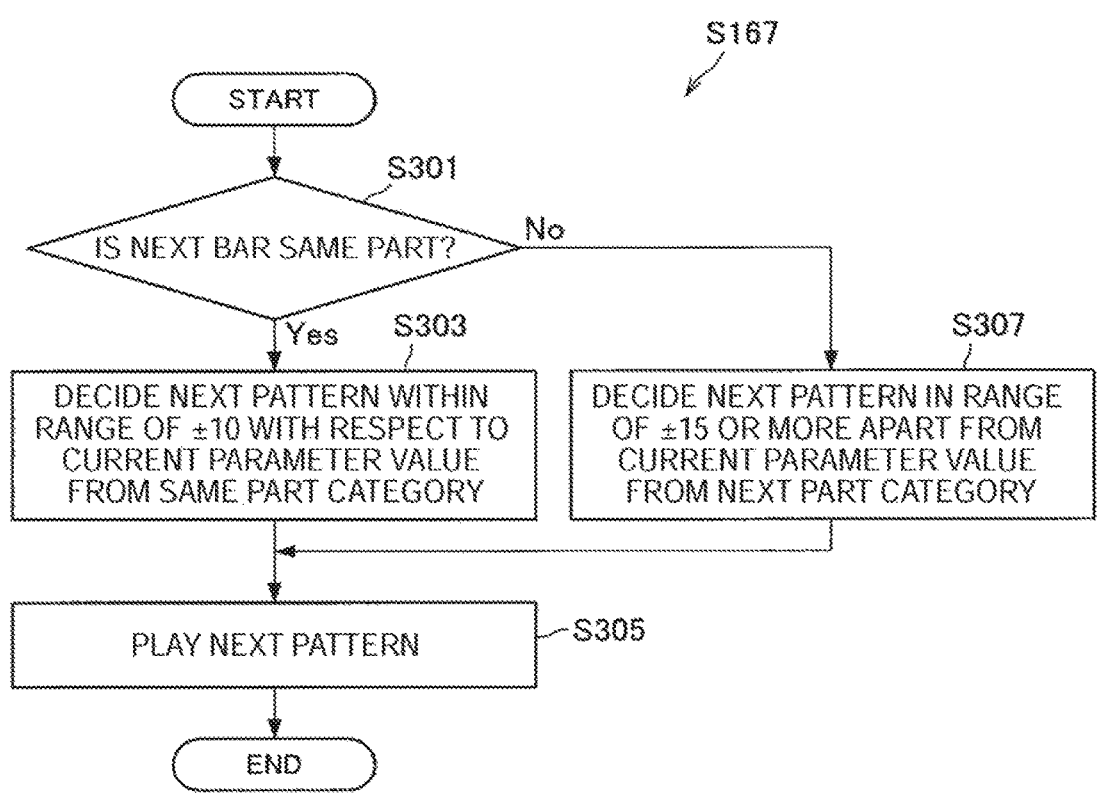
FIG. 17 is a flowchart illustrating the flow of "pattern change processing" according to the first embodiment.

Next, the flow of "pattern change processing" in S167 is described with reference to FIG. 17. As illustrated in FIG. 17, first, the decision unit 104 determines whether the next bar is included in the same part (S301). In the case where the next bar is included in the same part (S301: Yes), the decision unit 104 randomly selects a processing pattern whose parameter value is equal to or more than −10 and equal to or less than 10 with respect to the parameter value of the current processing pattern, from among processing patterns other than the current processing pattern, the processing patterns being associated with the same part, and decides the selected processing pattern as a processing pattern to be executed next (S303). Subsequently, the processing control unit 106 causes the device 20 to execute processing corresponding to the decided processing pattern (S305). Then, the "pattern change processing" ends.

In the case where the next bar is included in the next part (S301: No), the decision unit 104 randomly selects a processing pattern whose parameter value is −15 or less or 15 or more with respect to the parameter value of the current processing pattern, from among a plurality of processing patterns associated with the next part, and decides the selected processing pattern as a processing pattern to be executed next (S307). Then, the information processing apparatus 10 executes the processing of S305 and subsequent steps.

{1-4-4. Processing for End of Tune}

Figure 18:
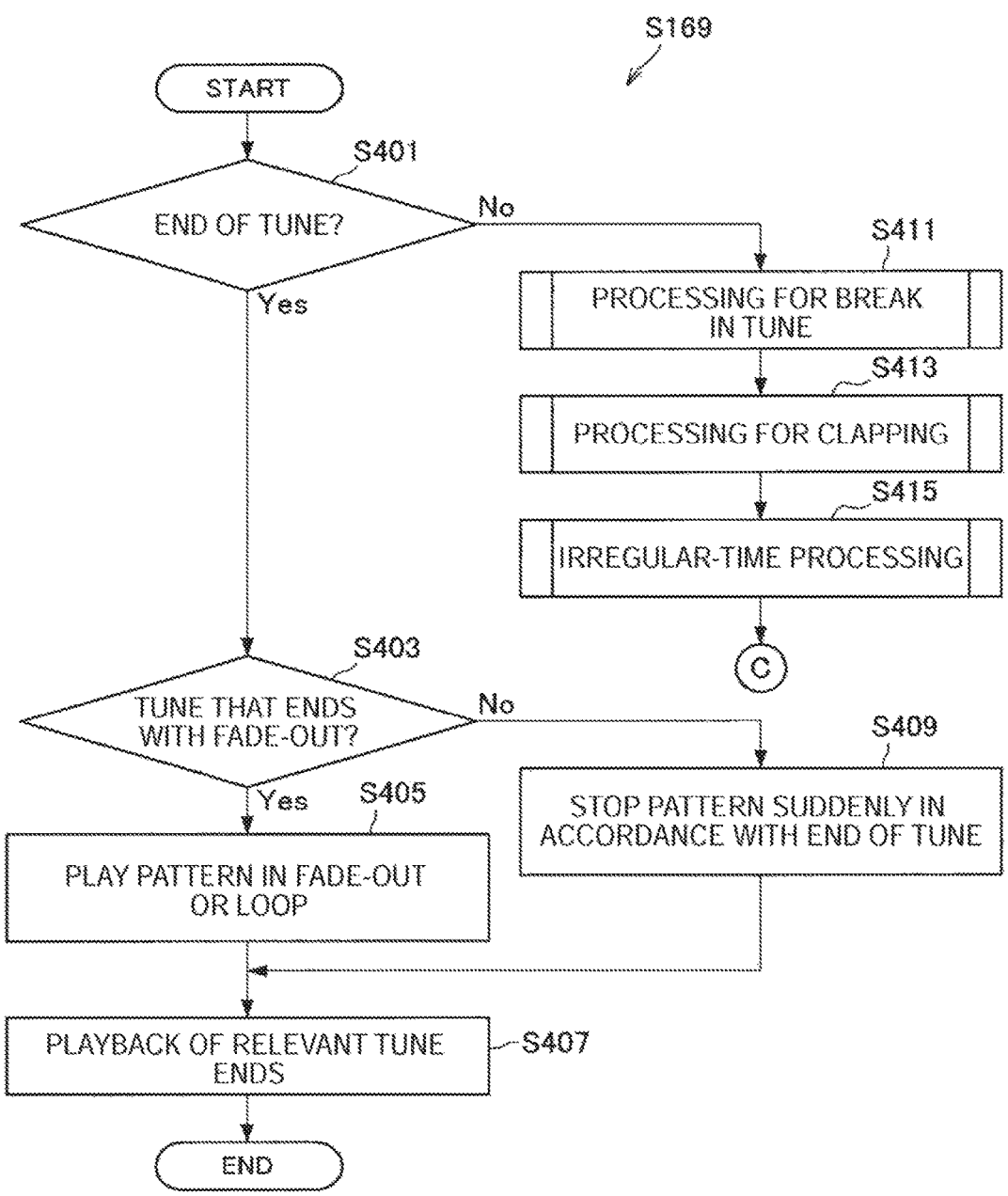
FIG. 18 is a flowchart illustrating the flow of "processing for end of tune" according to the first embodiment.

Next, the flow of "processing for end of tune" in S169 is described with reference to FIG. 18. As illustrated in FIG. 18, first, the processing control unit 106 determines whether a section immediately before the end of the tune is reached (e.g., the remaining time is five seconds or less) (S401). In the case where a section immediately before the end of the tune is reached (S401: Yes), next, the processing control unit 106 determines whether the relevant tune is a tune that ends with a fade-out (S403). In the case where the relevant tune is a tune that ends with a fade-out (S403: Yes), the processing control unit 106 controls the device 20 in a manner that processing corresponding to the relevant processing pattern fades out (or loops) (S405). After that, playback of the relevant tune ends (S407). Then, the "processing for end of tune" ends.

In the case where the relevant tune is not a tune that ends with a fade-out (S403: No), the processing control unit 106 controls the device 20 in a manner that processing corresponding to the processing pattern stops suddenly in accordance with the end of the tune (S409). After that, the information processing apparatus 10 executes the processing of S407 and subsequent steps.

In the case where a section immediately before the end of the tune is not reached in S401 (S401: No), the information processing apparatus 10 executes "processing for break in tune" described later (S411). Subsequently, the information processing apparatus 10 executes "processing for clapping" described later (S413). Subsequently, the information processing apparatus 10 executes "irregular-time processing" described later (S415). After that, the information processing apparatus 10 executes the processing of S161 and subsequent steps again.

{1-4-5. Processing for Break in Tune}

Figure 19:
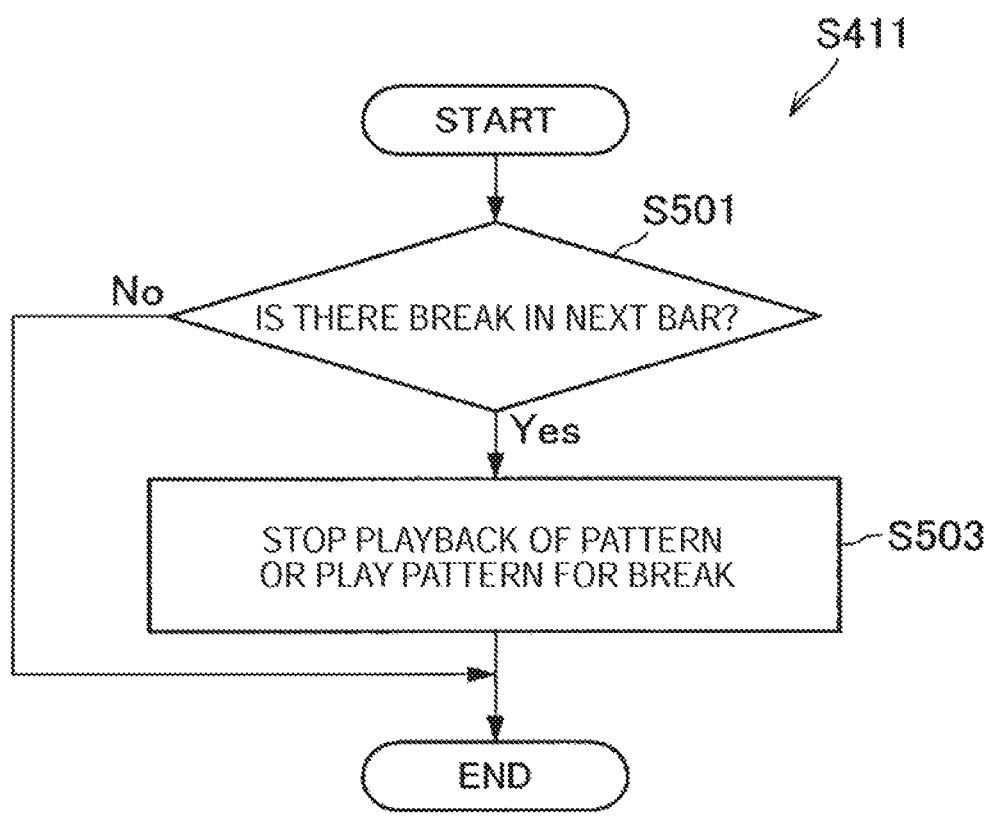
FIG. 19 is a flowchart illustrating the flow of "processing for break in tune" according to the first embodiment.

Next, the flow of "processing for break in tune" in S411 is described with reference to FIG. 19. As illustrated in FIG. 19, first, the processing control unit 106 determines whether there is a break (i.e., silence or a volume of a predetermined threshold value or less continues for a predetermined time period or more) in the next bar (S501). In the case where there is no break in the next bar (S501: No), the "processing for break in tune" ends.

In the case where there is a break in the next bar (S501: Yes), the processing control unit 106 performs control to cause the device 20 to suddenly stop the execution of processing corresponding to the current processing pattern, or newly execute processing corresponding to a dedicated processing pattern corresponding to the break, at the place of the detected break (S503). Then, the "processing for break in tune" ends.

{1-4-6. Processing for Clapping}

Figure 20:
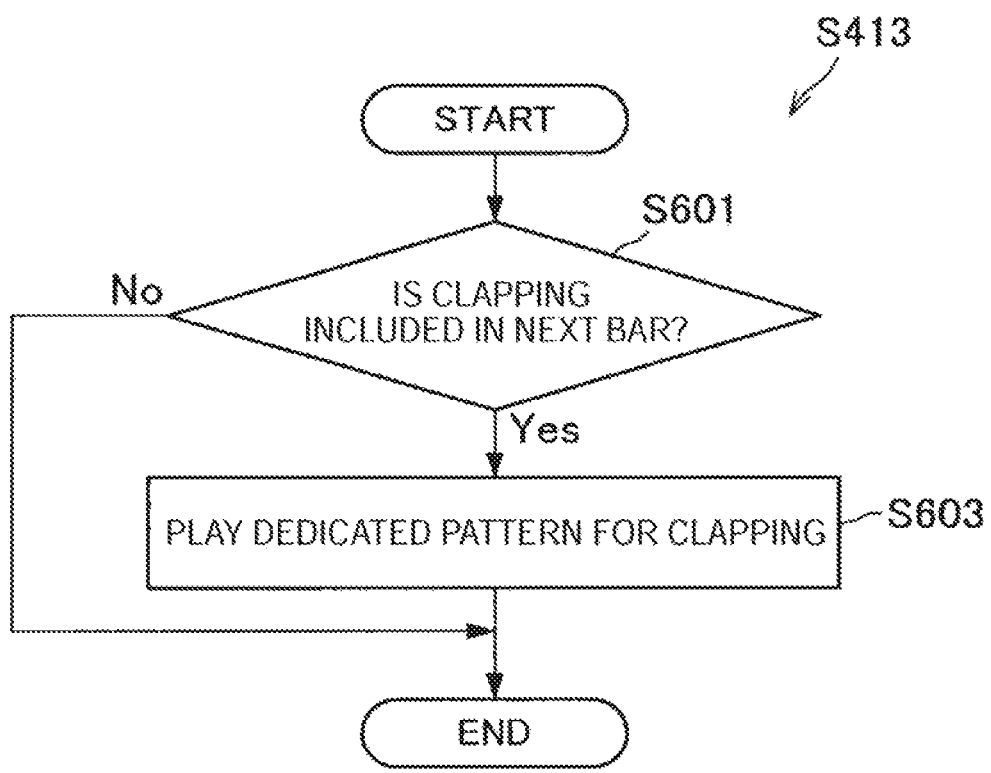
FIG. 20 is a flowchart illustrating the flow of "processing for clapping" according to the first embodiment.

Next, the flow of "processing for clapping" in S413 is described with reference to FIG. 20. As illustrated in FIG. 20, first, the processing control unit 106 determines whether clapping is included in the next bar (S601). In the case where clapping is not included in the next bar (S601: No), the "processing for clapping" ends.

In the case where clapping is included in the next bar (S601: Yes), the processing control unit 106 causes the device 20 to execute processing corresponding to a dedicated processing pattern for clapping, at the place of the detected clapping, for example (S603). Then, the "processing for clapping" ends.

{1-4-7. Irregular-Time Processing}

Figure 21:
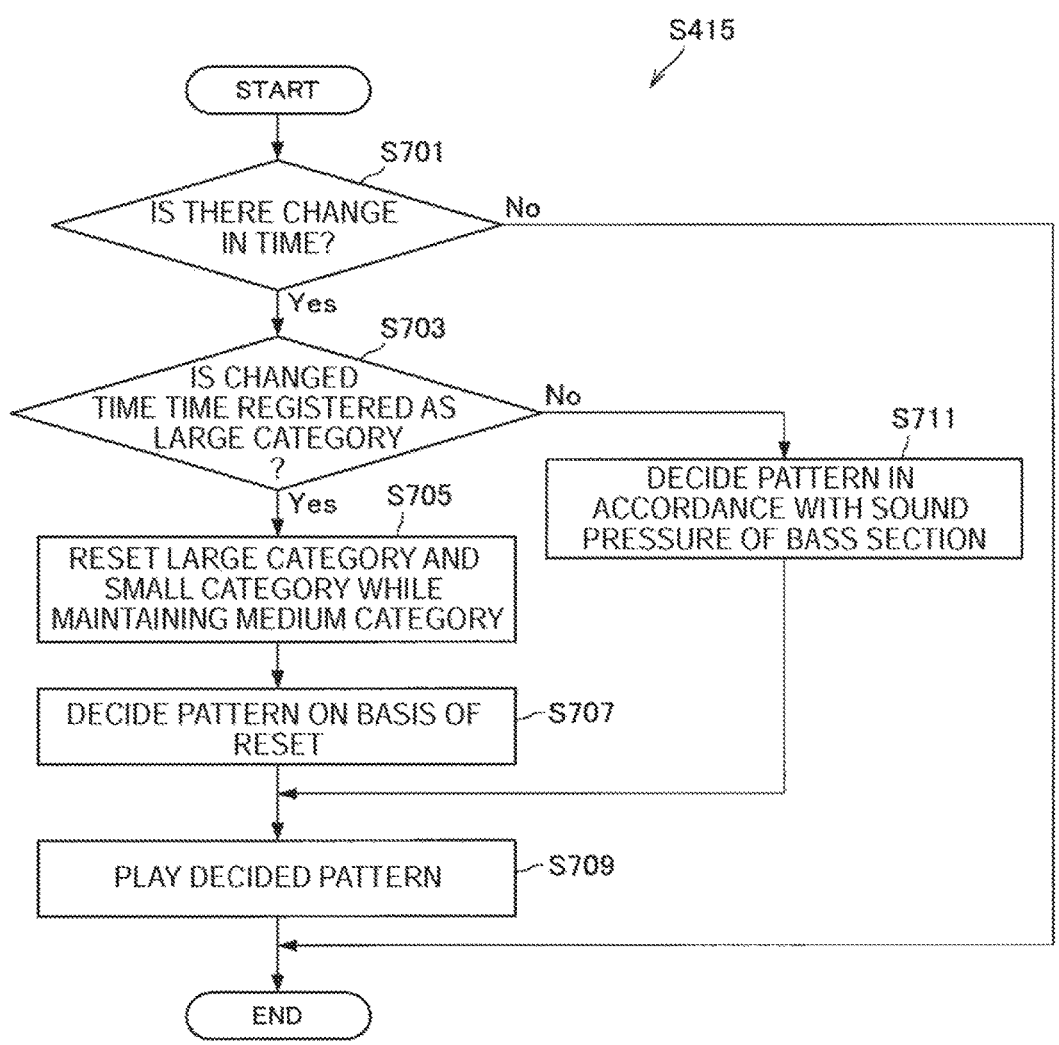
FIG. 21 is a flowchart illustrating the flow of "irregular-time processing" according to the first embodiment.

Next, the flow of "irregular-time processing" in S415 is described with reference to FIG. 21. As illustrated in FIG. 21, first, the decision unit 104 determines whether a change in time is detected (S701). In the case where a change in time is not detected (S701: No), the "irregular-time processing" ends.

In the case where a change in time is detected (S701: Yes), next, the decision unit 104 determines whether the changed time is the same as one of times registered as a large category in the processing pattern DB 124 (S703). In the case where it is determined that the changed time is the same as one of registered times (S703: Yes), the decision unit 104 resets the large category and the small category in accordance with the changed time while maintaining the medium category (S705). Then, the decision unit 104 decides a processing pattern to be newly executed, on the basis of the reset of the large category and the small category (S707).

Subsequently, the processing control unit 106 causes the device 20 to execute processing corresponding to the decided processing pattern (S709). Then, the "irregular-time processing" ends.

In the case where it is determined that the changed time is not the same as any of the registered times in S703 (S703: No), the decision unit 104 decides a processing pattern that matches the sound pressure of a bass section (instead of BPM) as a processing pattern to be newly executed (S711). Then, the information processing apparatus 10 executes the processing of S709 and subsequent steps.

<1-5. Effects>

As described above, according to the first embodiment, the information processing apparatus 10 decides, in accordance with playback target content, a processing pattern of processing to be executed in association with playback of the content, from among a plurality of processing patterns, and controls execution of processing corresponding to the decided processing pattern. Thus, according to the first embodiment, it is possible to execute a larger number of types of processing suitable for playback target content, in association with playback of the content.

For example, the information processing apparatus 10 varies a processing pattern (of vibration, display, etc.) of processing to be executed, depending on time, genre, and part of playback target music. Moreover, the information processing apparatus 10 can produce vibration in a silent section of the playback target music, or produce vibration with timing shifted from that of sound being played. Thus, a user listening to music can feel as if performance of another musical instrument or performance of another genre is added to the playback target music. This enables a rendering giving a stronger impression to the user. For example, the rendering makes the user feel music being played to be more impressive or passionate.

<1-6. Application Examples>

The first embodiment is not limited to the examples described above. Next, application examples of the first embodiment are described in "1-6-1. Application example 1" to "1-6-3. Application example 3". Details that overlap with the above description are omitted from description below.

{1-6-1. Application Example 1}

Now, an application example 1 is described. The background to the application example 1 is described first. In general, performance of many types of musical instruments and voices (singing voices) included in one tune may be buried in major sounds (e.g., a musical instrument playing the main melody, or vocal). Therefore, it is difficult for a user to listen to performance of other types of musical instruments and voices included in the tune (e.g., it is difficult to perceive them clearly).

As will be described later, according to the application example 1, making minor sounds included in one tune stand out as vibration enables the user to perceive them clearly.

(1-6-1-1. Configuration)

The application example 1 assumes a scene where one piece of music is analyzed, and for example, ten types of musical instruments and five types of voices (e.g., vocal and chorus) included in the piece of music are separated, or assumes a scene where playback timings of the ten types of musical instruments and five types of voices included in the piece of music are specified accurately by using score data.

In such a scene, the information processing apparatus 10 according to the application example 1 plays a tune while switching original sound data to be played as vibration, in accordance with progression of the playback of the piece of music. For example, first, at the beginning (Intro section) of the tune, the information processing apparatus 10 extracts sound of a specific musical instrument included in the Intro section, and then causes the device 20 to produce vibration in accordance with the rhythm of the extracted sound. Thus, the sound of the specific musical instrument can be boosted by using vibration.

Then, at each elapse of a predetermined number of bars, for example, the information processing apparatus 10 switches the sound of the original data of vibration to sound of another musical instrument (or voice). Thus, the musical instrument or voice boosted/emphasized as vibration is switched among various parts of a tune.

As described above, according to the application example 1, minor musical instruments, back chorus, and the like (which would be inconspicuous if without vibration) stand out as vibration, and thus can be expected to be recognized also as sound by the user. In addition, since minor sounds can sometimes be emphasized, it can be expected that the user is given a fresh impression and prevented from being bored.

{1-6-2. Application Example 2}

Next, an application example 2 is described. As will be described later, according to the application example 2, the information processing apparatus 10 can decide a processing pattern of processing to be executed concurrently with content playback, on the basis of a determination result of excitement related to playback target content.

(1-6-2-1. Overview)

The application example 2 assumes that an animation pattern is generated on the basis of a shot image of a person's motion. For example, first, video of a professional dancer dancing a plurality of types of steps is shot, and a moving image file is generated for each type of step on the basis of the shot images. The moving image file may be converted to dot animation by image processing. Furthermore, a key frame may be set for each dot animation. This key frame is, in the case where dot animation is displayed concurrently with playback of music, a frame whose display timing is matched with the beat of the music.

(1-6-2-2. Configuration)

Next, a configuration of the information processing apparatus 10 according to the application example 2 is described. The decision unit 104 according to the application example 2 decides a processing pattern of processing to be executed when music is played, on the basis of a determination result of excitement related to playback target music. For example, first, the decision unit 104 determines the degree of excitement in each section of the music, on the basis of an analysis result of the average sound pressure or the like of the playback target music. Then, on the basis of the determination result, the decision unit 104 decides a processing pattern to be executed in each section of the music, in a manner that excitement of the music matches excitement of the executed processing pattern. For example, the decision unit 104 decides a slow, calm processing pattern for a place with small excitement in the music. In addition, the decision unit 104 decides a fast, intense processing pattern for a place with large excitement in the music.

Here, description is given on an example when it is desired that animation of gentle dance (e.g., walking) be displayed in the Intro section of music, animation in which the tempo of steps gradually becomes faster be displayed in an intermediate section, and animation of extreme dance be displayed in the Sabi section. In this case, the decision unit 104 decides a calm animation pattern for the Intro section of the music. For an intermediate section of the music, the decision unit 104 decides an animation pattern with a faster tempo of animation as appropriate as longer time elapses. The decision unit 104 decides an intense animation pattern for the Sabi section of the music.

Also assumed is a case where music and an animation pattern do not match in timing during playback of music. In such a case, if the timing of the animation is suddenly corrected, smoothness of the animation may be lost. Hence, it is desirable that the processing control unit 106 gently adjust the speed between key frames (e.g., adjust the speed within a range of equal to or more than −50% and equal to or less than 50% with respect to the current speed) while maintaining the tempo of key frames, for example. Thus, the mismatch in timing between the music and the animation pattern can be corrected smoothly.

(1-6-2-3. Modification Examples)

Modification Example 1: Reflection of Vibration

As a modification example, a vibration pattern of vibration to be produced may be decided in accordance with a dancer's motion displayed on a display screen. Here, a case where a dancer's motion is displayed on a display screen may be a case where a moving image in which the dancer's motion is shot is displayed on the display screen, or may be a case where dot animation of the dancer's motion is displayed on the display screen. For example, the information processing apparatus 10 (the decision unit 104) decides a vibration pattern on the basis of an analysis result of shot images corresponding to the dancer's motion displayed on the display screen. Without being limited to this example, a vibration pattern can be designated in advance by a user for each type of motion of the displayed dancer.

For example, at the display timing of a motion of the dancer stepping his/her foot, "Don", the decision unit 104 decides a vibration pattern that produces vibration of "Don" as a vibration pattern to be executed. At the display timing of an animation of the dancer clapping his/her hands, "Pan", the decision unit 104 decides a vibration pattern that produces vibration of "Pan" as a vibration pattern to be executed. These decision examples enable musical experience with more excitement. For example, a user listening to music can feel a dancer's motion to be more dynamic or passionate.

Modification Example 2: Reflection of Performance

As another modification example, the processing control unit 106 can dynamically change displayed animation in response to detection of performance by a user. For example, when a virtual keyboard is manipulated by the user, the processing control unit 106 dynamically changes the displayed animation (e.g., a jump of the dancer displayed on the display screen).

Here, animation may be composed of modeling data. In this case, the processing control unit 106 may control display in a manner that joint points of a displayed character move, for example, in response to detection of performance by the user. This example enables the user to move the character in a complicated way in accordance with the performance.

Moreover, the processing control unit 106 can dynamically change displayed animation in response to detection of performance by a plurality of users. For example, in the case where animation of one dancer is displayed, in regard to the dancer's body, an area whose motion is controllable may be set in advance for each user. Then, on the basis of detection of performance by each of the plurality of users during display of the animation, the processing control unit 106 can control display in a manner that an area of the dancer's body allocated to the user moves.

It is desirable that one input or sequential inputs related to performance be associated with a series of motions (in animation). For example, it is desirable that when one input is done for each bar, motion be allocated in a manner that a dancer performs a series of motions. Roughly converting user input in this manner enables the user to change animation easily and freely. Thus, the user can enjoy performance.

{1-6-3. Application Example 3}

Next, an application example 3 is described. As will be described later, according to the application example 3, the information processing apparatus 10 can cause the vibration device 20*a* to produce appropriate vibration corresponding to the sound of a musical instrument not included in the music, on the basis of an analysis result of tune information of playback target music.

The application example 3 assumes a scene where tune information of playback target music is analyzed, and positions of bars, chord (e.g., "C", "Dm", and "G") progression information, part, tempo, and timing information of time are acquirable as an analysis result.

(1-6-3-1. Addition of Vibration Corresponding to Bass Guitar)

In this case, the information processing apparatus 10 according to the application example 3 can cause the vibration device 20*a* to produce vibration corresponding to a melody of a musical instrument not included in the playback target music (e.g., a bass guitar), on the basis of the analyzed positions of bars and chord progression information.

Control Example 1

Figure 22:
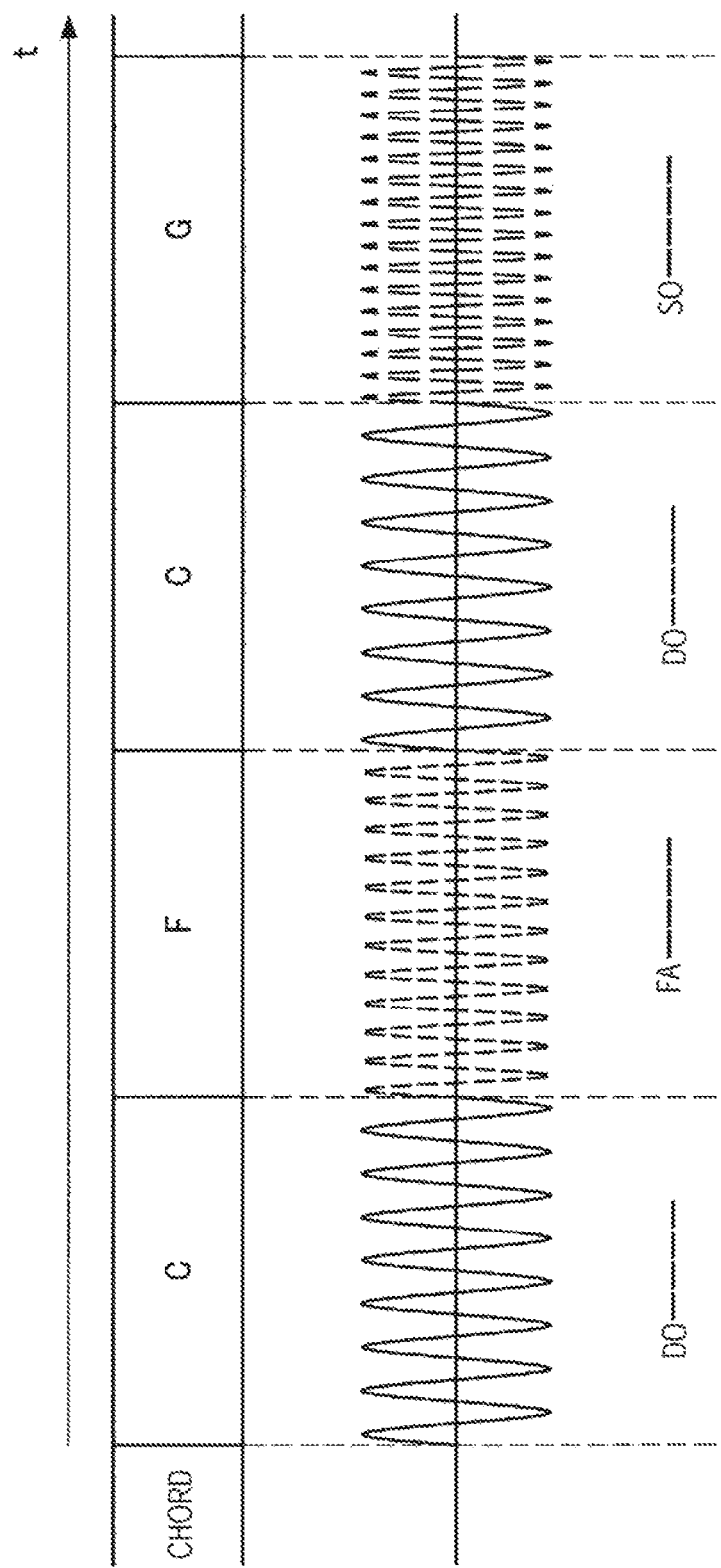
FIG. 22 illustrates a production example of vibration according to an application example 3 of the first embodiment.

Here, the above function is described in more detail with reference to FIG. 22. FIG. 22 illustrates a production example (generation example) of vibration corresponding to a melody of a bass guitar, which is based on chord progression information analyzed from tune information of playback target music. For example, first, the information processing apparatus 10 sets vibration cycles corresponding to individual chords in advance in a manner that the vibration cycle differs among chords. Then, as illustrated in FIG. 22, in the period of the current or subsequent chord (e.g., the next chord) in the music specified from the analyzed chord progression information, the information processing apparatus 10 performs control to cause the vibration device 20*a* to produce vibration of the cycle set for the chord.

For example, when the chord is "C", the information processing apparatus 10 keeps causing the vibration device 20*a* to produce vibration of the cycle corresponding to "do" (a sound corresponding to "C") during the period of the chord. When the chord is "E", the information processing apparatus 10 keeps causing the vibration device 20*a* to produce vibration of the cycle corresponding to "mi" (a sound corresponding to "E") during the period of the chord.

Control Example 2

Alternatively, the information processing apparatus 10 can set vibration patterns corresponding to individual chords in advance in a manner that the vibration pattern differs among chords. In this case, in the period of the current or subsequent chord (e.g., the next chord) in the music specified from chord progression information analyzed from tune information of playback target music, the information processing apparatus 10 performs control to cause the vibration device 20*a* to produce vibration of the pattern set for the chord. For example, when the chord is "C", the information processing apparatus 10 causes the vibration device 20*a* to produce vibration of a unique pattern (e.g., "domi domi domi domi") mainly composed of "do" (a sound corresponding to "C") during the period of the chord. When the chord is "E", the information processing apparatus 10 causes the vibration device 20*a* to produce vibration of a unique pattern (e.g., "mifa mifa mifa mifa") mainly composed of "mi" (a sound corresponding to "E") during the period of the chord.

Control Example 3

Alternatively, the information processing apparatus 10 can set vibration patterns corresponding to individual combinations of chords and parts in advance in a manner that the vibration pattern differs among combinations. In this case, for each combination of a part analyzed from tune information of playback target music and the current or subsequent chord (e.g., the next chord) in the music specified from analyzed chord progression information, the information processing apparatus 10 causes the vibration device 20a to produce vibration of the pattern set for the combination in the period of the combination.

For example, when the chord is "C" and the part is "Verse", the information processing apparatus 10 causes the vibration device 20a to produce vibration of a unique pattern (e.g., "domi domi domi domi") mainly composed of "do" (a sound corresponding to "C") in the period of the combination of the chord and the part. When the chord is "E" and the part is "Verse", the information processing apparatus 10 causes the vibration device 20a to produce vibration of a unique pattern (e.g., "mifa mifa mifa mifa") mainly composed of "mi" (a sound corresponding to "E") in the period of the combination of the chord and the part. When the chord is "C" and the part is "Chorus", the information processing apparatus 10 causes the vibration device 20a to produce vibration of a unique pattern (e.g., "dodomire dodomire dodomire dodomire") mainly composed of "do" (a sound corresponding to "C") in the period of the combination of the chord and the part. When the chord is "E" and the part is "Chorus", the information processing apparatus 10 causes the vibration device 20a to produce vibration of a unique pattern (e.g., "mifamire mifamire mifamire mifamire") mainly composed of "mi" (a sound corresponding to "E") in the period of the combination of the chord and the part.

(1-6-3-2. Addition of Vibration Corresponding to Percussion Instrument)

The information processing apparatus 10 can cause the vibration device 20a to further produce vibration corresponding to sound of percussion instrument (e.g., a drum) not included in the music, on the basis of timing information of time (e.g., beat information) analyzed from tune information of playback target music. For example, the information processing apparatus 10 causes the vibration device 20a to produce vibration corresponding to a melody of a bass guitar (not included in the music) on the basis of the analyzed positions of bars and chord progression information, and causes the vibration device 20a to produce vibration corresponding to sound of a drum (not included in the music) on the basis of the analyzed beat information. Thus, a more massive impression can be given to a user listening to music.

Figure 23:
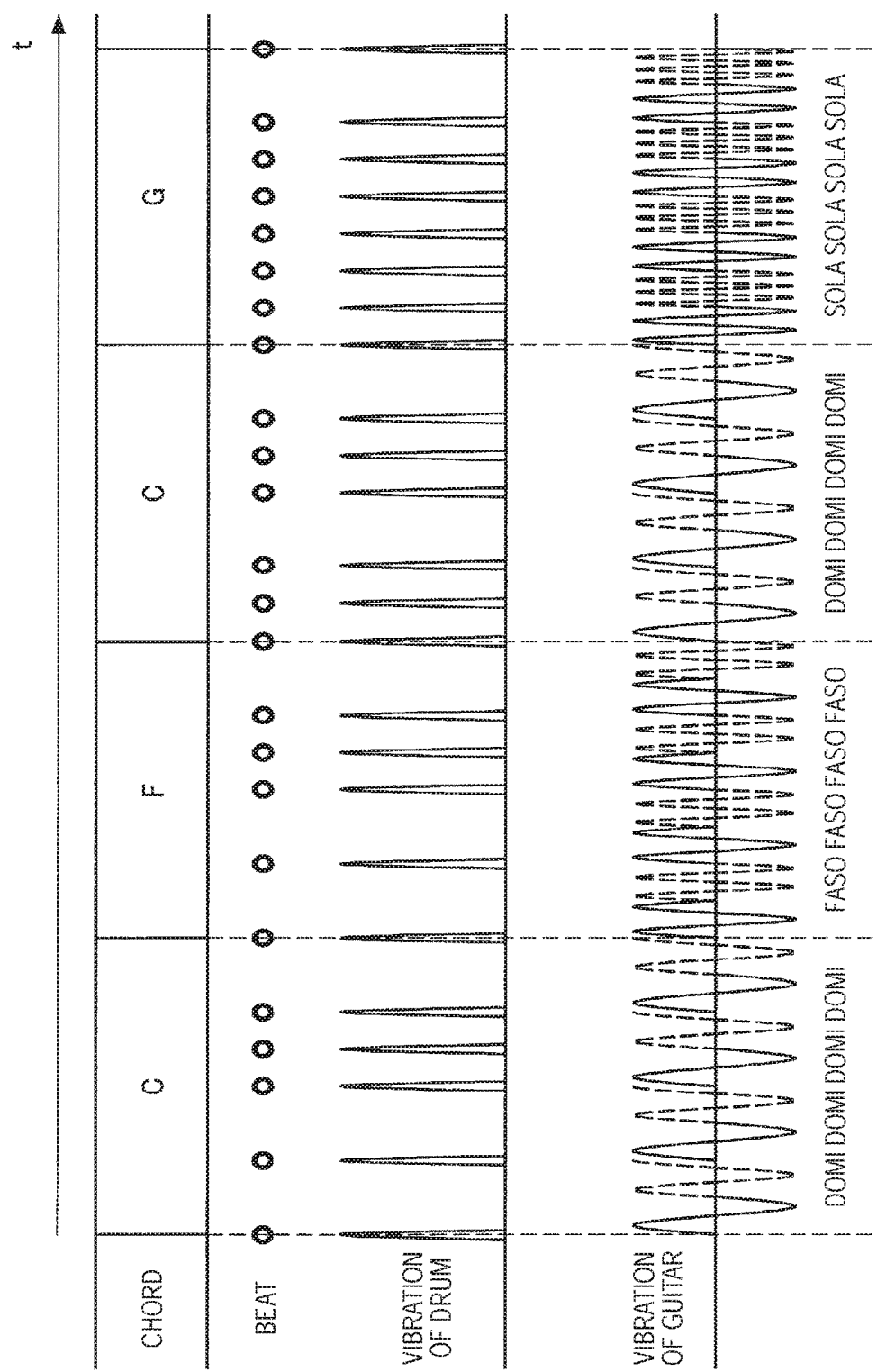
FIG. 23 illustrates a production example of vibration according to the application example 3 of the first embodiment.

Here, the above function is described in more detail with reference to FIG. 23. FIG. 23 illustrates a production example (generation example) of vibration corresponding to a bass guitar and vibration corresponding to a drum, which is based on chord progression information and beat information analyzed from tune information of playback target music. Note that the example illustrated in FIG. 23 assumes that vibration patterns corresponding to individual chords are set in advance in a manner that the vibration pattern corresponding to the bass guitar differs among chords.

As illustrated in FIG. 23, in the period of the current or subsequent chord (e.g., the next chord) in the music specified from the analyzed chord progression information, the information processing apparatus 10 causes the vibration device 20a to produce vibration of the pattern set in advance for the chord (as vibration corresponding to the bass guitar). Concurrently, the information processing apparatus 10 causes the vibration device 20a to produce vibration corresponding to the drum at timings of the beat indicated by the analyzed beat information. Note that as illustrated in FIG. 23, vibration corresponding to the drum may be vibration instantaneously produced only at timings of the relevant beat.

The above description describes the example in which vibration patterns corresponding to individual chords are set in a manner that the vibration pattern corresponding to the bass guitar differs among chords, but the present disclosure is not limited to this example. For example, vibration patterns corresponding to individual combinations of chords and parts may be set in a manner that the vibration pattern corresponding to the bass guitar differs among combinations. Also in this case, the information processing apparatus 10 may cause the vibration device 20a to produce vibration in a manner similar to that of the example illustrated in FIG. 23.

2. Second Embodiment

The first embodiment has been described. As described above, when content is played, the information processing apparatus 10 according to the first embodiment changes a processing pattern of processing that the device 20 is caused to execute, in accordance with the content.

Next, a second embodiment is described. As will be described later, an information processing apparatus 40 according to the second embodiment is capable of changing a processing pattern of executed processing (e.g., producing vibration or displaying illumination) in response to an incoming call or reception of an e-mail from another user, for example.

<2-1. System Configuration>

Figure 24:
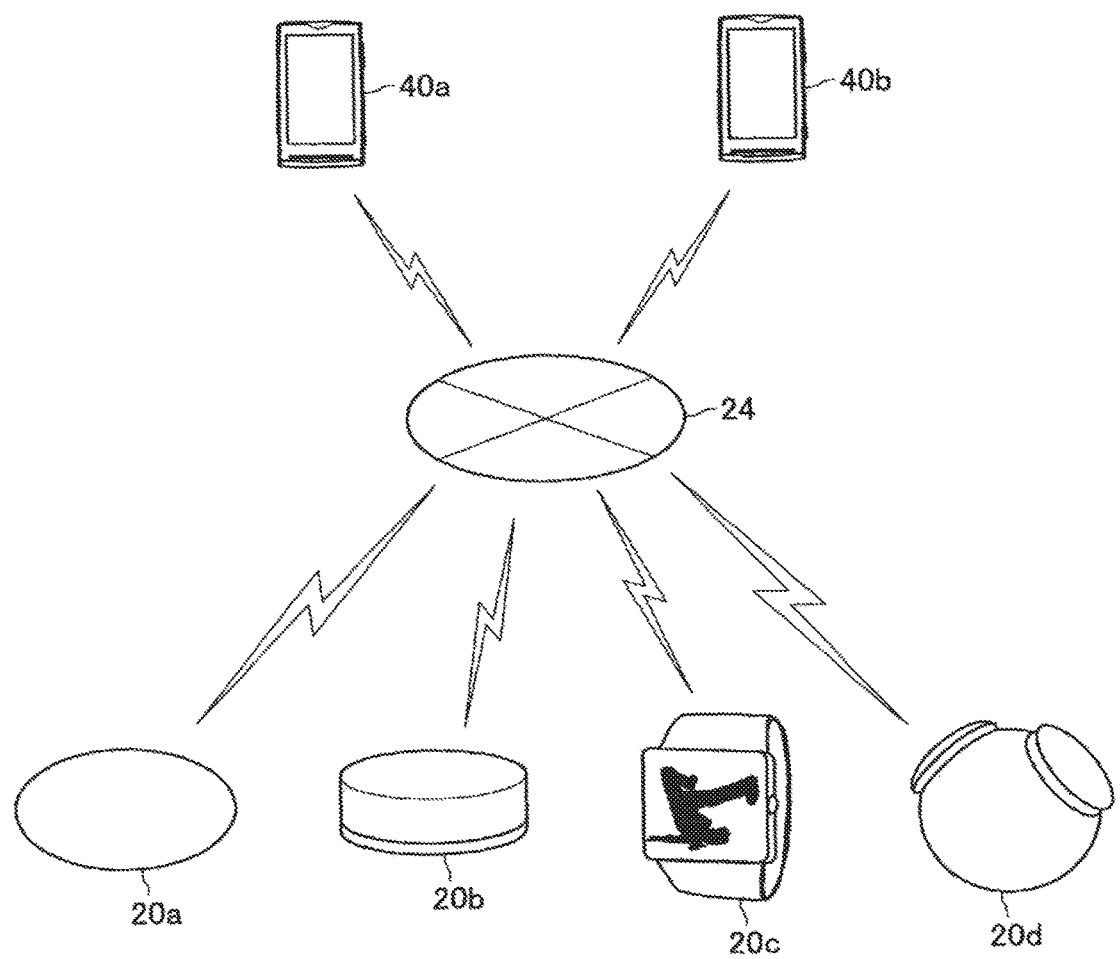
FIG. 24 is an explanatory diagram illustrating a configuration example of an information processing system according to a second embodiment.

First, a configuration example of an information processing system according to the second embodiment is described with reference to FIG. 24. As illustrated in FIG. 24, the information processing system according to the second embodiment further includes a plurality of information processing apparatuses 40 instead of including the information processing apparatus 10 and the content playback apparatus 22, in comparison with the first embodiment illustrated in FIG. 1. Description will be given only on details different from those of the first embodiment, and description of the same details is omitted.

{2-1-1. Information Processing Apparatus 40}

The information processing apparatus 40 is an apparatus for a user to perform communication with another user. For example, the information processing apparatus 40 is capable of receiving an incoming call from another user, or receiving an electronic mail, a short message, etc. transmitted by another user. This information processing apparatus 40 may be a mobile phone such as a smartphone, as illustrated in FIG. 24.

The configuration of the information processing system according to the second embodiment is not limited to the example described above. For example, the information processing system does not necessarily include the device 20.

<2-2. Configuration>

Figure 25:
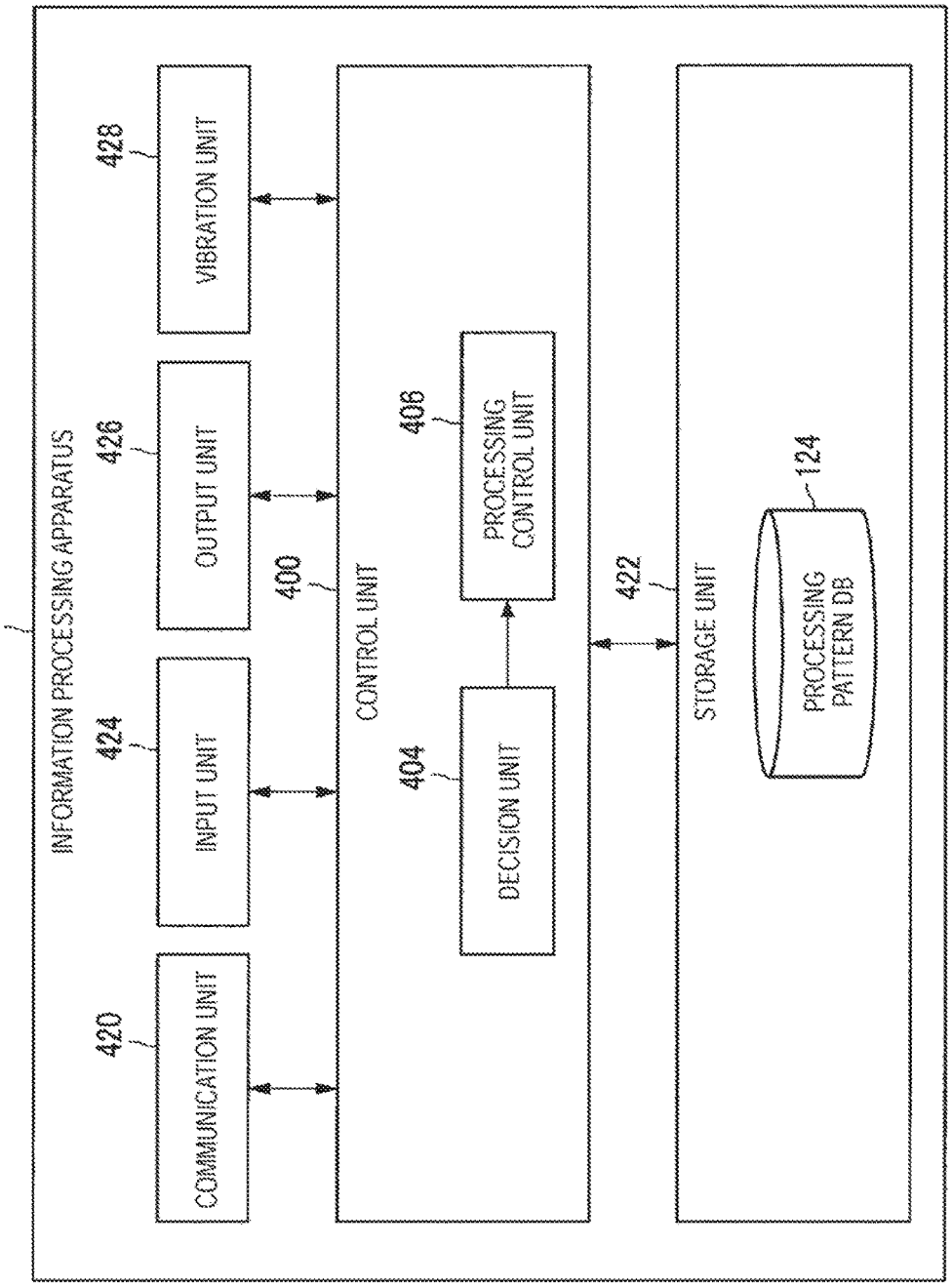
FIG. 25 is a functional block diagram illustrating a configuration example of an information processing apparatus 40 according to the second embodiment.

The configuration of the information processing system according to the second embodiment has been described. Next, a configuration according to the second embodiment is described. FIG. 25 is a functional block diagram illustrating a configuration example of the information processing apparatus 40 according to the second embodiment. As illustrated in FIG. 25, the information processing apparatus 40 includes a control unit 400, a communication unit 420, an input unit 424, an output unit 426, a vibration unit 428, and a storage unit 422. The control unit 400 includes a decision unit 404 and a processing control unit 406.

The functions of the communication unit 420 and the storage unit 422 are substantially the same as those of the communication unit 120 and the storage unit 122 according to the first embodiment, respectively.

{2-2-1. Decision Unit 404}

In response to an incoming call or reception of information from another user, the decision unit 404 decides a processing pattern of processing to be executed in association with the reception of the information, from among a plurality of processing patterns registered in advance. For example, the decision unit 404 decides a processing pattern of processing to be executed in association with the reception of the information, in accordance with the relationship between the other user who has transmitted information and a user having the information processing apparatus 40 (hereinafter referred to as target user) As an example, in the case where the other user who has transmitted information has a predetermined relationship with the target user (e.g., in the case where the other user is the target user's family member or friend), the decision unit 404 decides a special processing pattern as a processing pattern to be executed in association with the reception of the information. In the case where the other user who has transmitted information does not have a predetermined relationship with the target user, the decision unit 404 decides a standard processing pattern as a processing pattern to be executed in association with the reception of the information.

In addition, the decision unit 404 can decide a processing pattern of processing to be executed in association with the reception of the information, in accordance with details of information transmitted by the other user. For example, the decision unit 404 decides a processing pattern of processing to be executed in association with the reception of the information, in accordance with a positive level (evaluation value) calculated from the information (e.g., text or an image). Here, the positive level may be calculated on the basis of a keyword included in the relevant text, or facial expressions of a person in the relevant image.

Moreover, the decision unit 404 can decide a processing pattern of processing to be executed in association with the reception of the information, in accordance with information on the state of the target user when the information is received. Here, the information on the state of the target user includes, for example, an estimation result of the emotion of the target user and information indicating the situation of the target user. For example, in the case where it is estimated that the target user is enjoying when the information is received, the decision unit 404 may decide a processing pattern with a fast tempo. In the case where it is estimated that the target user is angry or sad when the information is received, the decision unit 404 may decide a calm processing pattern. In addition, in the case where the target user is on a train or is working or studying when the information is received, the decision unit 404 may decide a calm processing pattern.

{2-2-2. Processing Control Unit 406}

The processing control unit 406 causes the device 20, the output unit 426, or the vibration unit 428 to execute processing corresponding to the processing pattern decided by the decision unit 404. For example, the processing control unit 406 causes the device 20 or the vibration unit 428 to produce vibration corresponding to the vibration pattern decided by the decision unit 404, causes the device 20 or the output unit 426 to display illumination corresponding to the decided illumination pattern, causes the device 20 or the output unit 426 to display a moving image corresponding to the decided animation pattern, or causes the device 20 to execute operation corresponding to the decided motion pattern.

Specific functions of the processing control unit 406 are substantially the same as those of the processing control unit 106 according to the first embodiment.

{2-2-3. Input Unit 424}

The input unit 424 accepts various types of user input, such as a manipulation of receiving an incoming call.

{2-2-4. Output Unit 426}

The output unit 426 is controlled by the processing control unit 406 to emit light or output audio. For example, the output unit 426 includes a display unit including a display configured with an LCD or an OLED, an LED, or the like, and an audio output unit. Note that part of the input unit 424 and the display unit may be configured integrally in the case where, for example, the display is configured as a touch display.

{2-2-5. Vibration Unit 428}

The vibration unit 428 is controlled by the processing control unit 406 to produce vibration.

<2-3. Operation>

Figure 26:
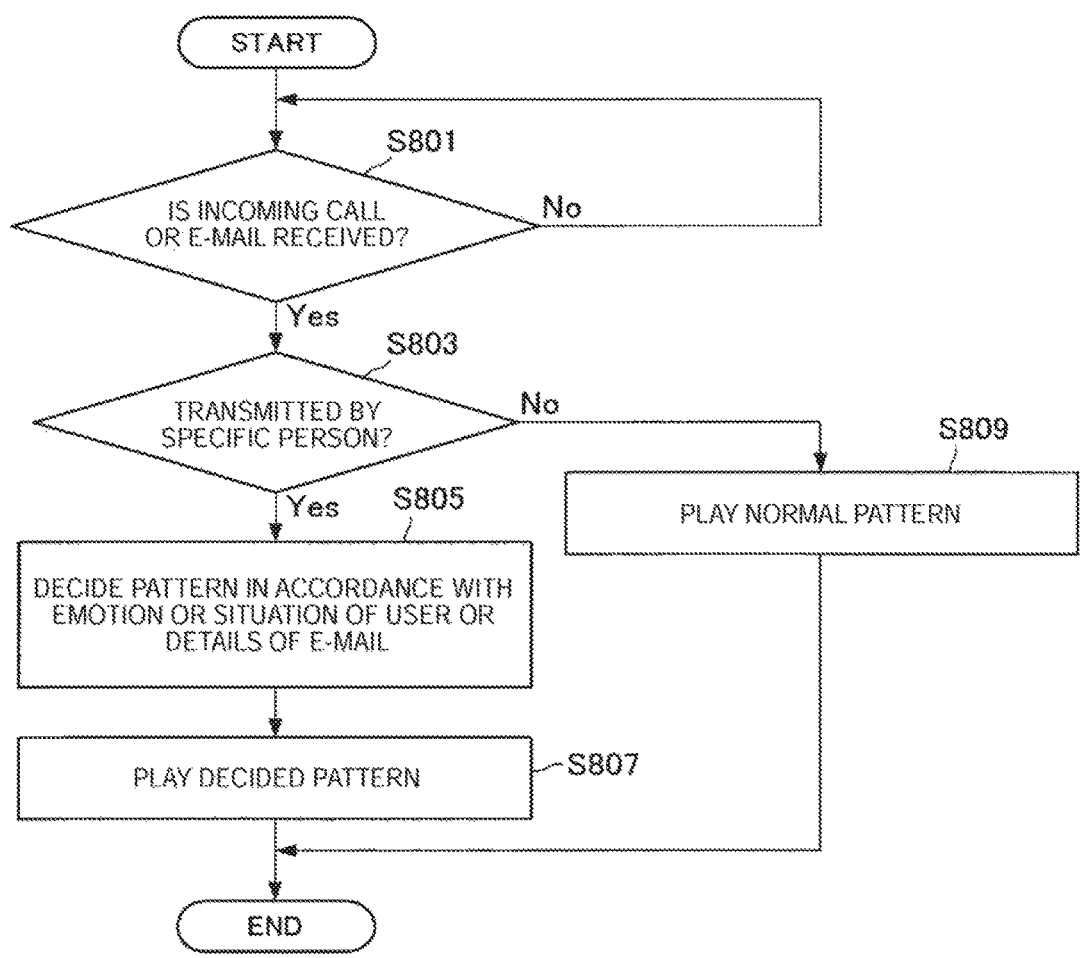
FIG. 26 is a flowchart illustrating part of an operation example according to the second embodiment.

The configuration according to the second embodiment has been described. Next, operation according to the second embodiment is described with reference to FIG. 26. FIG. 26 is a flowchart illustrating the operation according to the second embodiment.

As illustrated in FIG. 26, first, the information processing apparatus 40 waits until an incoming call or an e-mail is received from another user (S801). When an incoming call or an e-mail is received (S801: Yes), the decision unit 404 determines whether the other user has a specific relationship with the target user (S803). In the case where the other user has a specific relationship with the target user (S803: Yes), the decision unit 404 decides a processing pattern of processing to be executed, in accordance with an estimation result of the current emotion of the target user or the current situation of the target user, from among a plurality of processing patterns registered in the processing pattern DB 124. Alternatively, in the case where an e-mail was received in S801, the decision unit 404 may decide a processing pattern further in accordance with details of the received e-mail (S805).

Subsequently, the processing control unit 406 causes the device 20, the output unit 426, or the vibration unit 428 to execute processing corresponding to the decided processing pattern (S807). Then, the information processing apparatus 40 ends this operation.

In the case where the other user does not have a specific relationship with the target user (S803: No), the processing control unit 406 causes the device 20, the output unit 426, or the vibration unit 428 to execute processing corresponding to a standard processing pattern (S809). Then, the information processing apparatus 40 ends this operation.

<2-4. Effects>

As described above, according to the second embodiment, when an incoming call or an e-mail is received from another user, the information processing apparatus 40 changes a processing pattern of processing to be executed, in accordance with the relationship between the other user and the target user, details of the received e-mail, the state of the target user at the time of reception, or the like. This enables a rendering giving a stronger impression to the user in regard to an incoming call or reception of an e-mail. Thus, the user can further enjoy phone conversations and exchange of e-mails with other users.

3. Hardware Configuration

Figure 27:
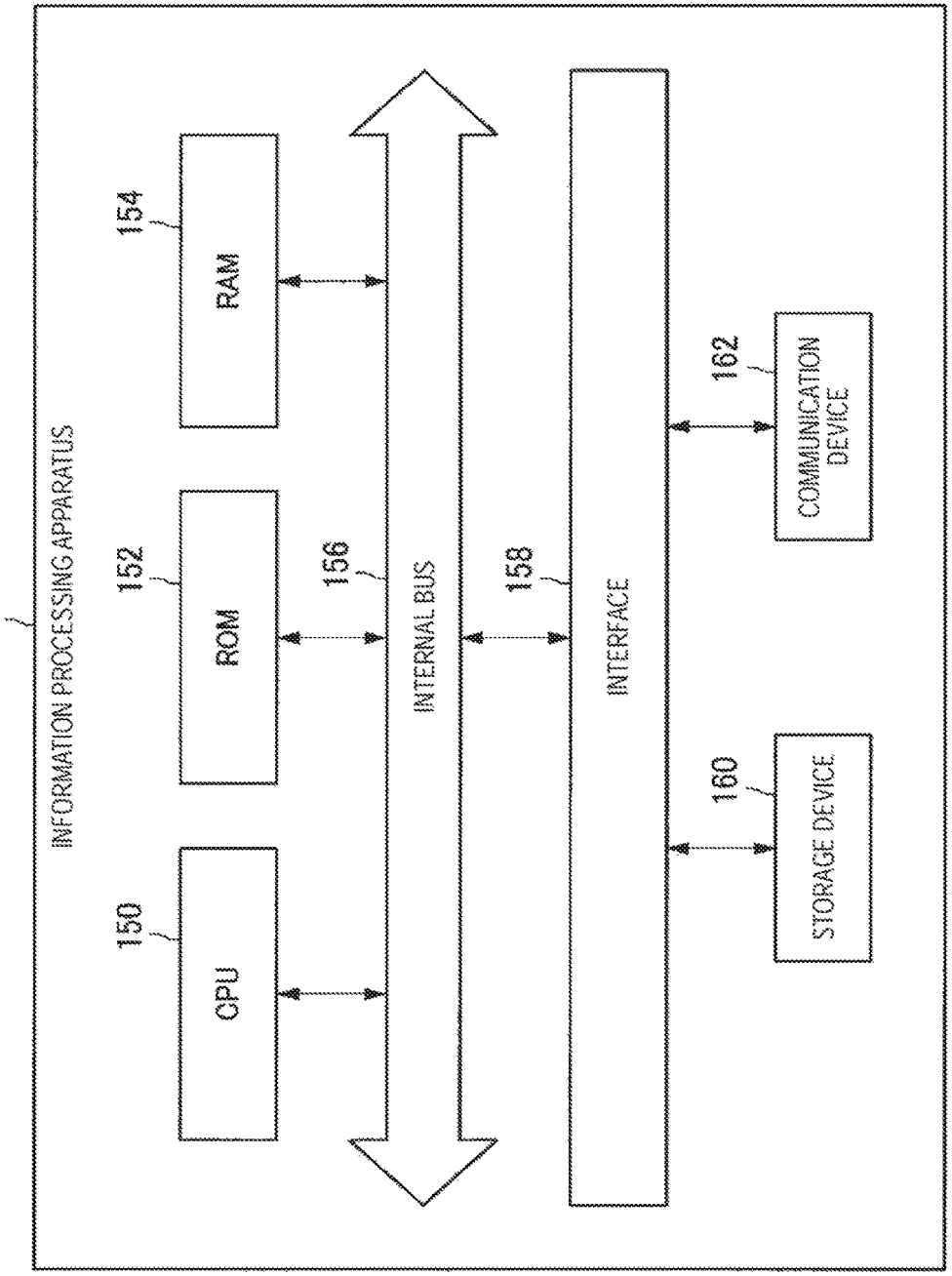
FIG. 27 is an explanatory diagram illustrating a hardware configuration example of the information processing apparatus 10 according to the first embodiment.

Next, a hardware configuration of the information processing apparatus 10 according to the first embodiment is described with reference to FIG. 27. As illustrated in FIG. 27, the information processing apparatus 10 is configured to include a CPU 150, a read only memory (ROM) 152, a RAM 154, a bus 156, an interface 158, a storage device 160, and a communication device 162.

The CPU 150 functions as an arithmetic processing unit and a control unit, and controls the overall operation in the information processing apparatus 10 in accordance with various programs. In addition, the CPU 150 implements the functions of the control unit 100 in the information processing apparatus 10. Moreover, the CPU 150 is composed of a processor such as a microprocessor.

The ROM 152 stores programs and control data such as operation parameters, which are used by the CPU 150.

The RAM 154 temporarily stores, for example, programs or the like executed by the CPU 150.

The bus 156 is composed of a CPU bus or the like. The bus 156 connects the CPU 150, the ROM 152, and the RAM 154 to each other.

The interface 158 connects the bus 156 with the storage device 160 and the communication device 162.

The storage device 160 is a device for data storage that functions as the storage unit 122. The storage device 160 includes, in one example, a storage medium, a recording device that records data in the storage medium, a reading device that reads data from the storage medium, and a deletion device that deletes data recorded in the storage medium.

The communication device 162 is a communication interface composed of, in one example, a communication device or the like for connecting to the communication network 24 or the like. In addition, the communication device 162 may be a wireless LAN compatible communication device, a long-term evolution (LTE) compatible communication device, or a wire communication device that performs wired communication. The communication device 162 functions as the communication unit 120.

A hardware configuration of the information processing apparatus 40 according to the second embodiment may be a configuration including the entire hardware configuration described above.

4. Modification Examples

It should be understood by those skilled in the art that various modifications, combinations, sub-combinations and alterations may occur depending on design requirements and other factors insofar as they are within the scope of the appended claims or the equivalents thereof.

<4-1. Modification Example 1>

For example, the information processing apparatus 10 or the information processing apparatus 40 can cause the device 20 to produce vibration in a manner that another object resonates on the basis of the vibration of the device 20. As an example, the information processing apparatus 10 may cause the device 20 to produce vibration in a manner that sound of a predetermined scale is produced from a glass by transfer of the vibration of the device 20 to the glass. The information processing apparatus 10 may cause the device 20 to produce vibration in a manner that the vibration of the device 20 transfers to a drum or a bell and the drum or the bell produces sound. Alternatively, the information processing apparatus 10 may cause the device 20 to produce vibration in a manner that motion of a fluid is changed by transfer of the vibration of the device 20 to the fluid. For example, in a scene where beer or carbonated water is in a glass, the information processing apparatus 10 may cause the device 20 to produce vibration in a manner that bubbles are formed in the beer or carbonated water by transfer of the vibration of the device 20 to the glass. In a scene where coffee and milk are in a glass, the information processing apparatus 10 may cause the device 20 to produce vibration in a manner that the coffee and milk are mixed by transfer of the vibration of the device 20 to the glass.

Moreover, in a scene where light is shone on a water surface, the information processing apparatus 10 may cause the device 20 to produce vibration in a manner that the water surface wavers on the basis of the vibration of the device 20. Thus, vibration can be expressed by a change in light shone on the water surface, which enables a user to visually experience the vibration.

<4-2. Modification Example 2>

The above embodiments describe examples in which the type of information that the device 20 is caused to output is vibration, illumination, animation, or motion, but the present disclosure is not limited to such examples. For example, the type of the information may be information of another sense, such as heat, pressure, pain, itching, taste, or smell. Note that heat may be heat of a solid that is touched directly or indirectly by a user, heat for raising the temperature of blown air, or heat for raising the temperature of water. Pressure may be the pressure of blown air, pressing force against the user's body, or attractive force in a space where the user is.

Alternatively, the type of the information may be information of a pseudo-sense that is different from normal senses (that a human has). For example, the type of the information may be an electric pulse signal from a biometric stimulation device, or additional information, other than visual information, from a visual biometric device (e.g., artificial eye).

<4-3. Modification Example 3>

Further, the steps in the operation of each embodiment described above are not necessarily to be executed in the described order. In one example, the steps may be executed in the order changed as appropriate. In addition, the steps may be executed in parallel or individually in part, instead of being executed in chronological order. In addition, some of the steps described may be omitted, or an additional step may be added.

Further, according to the above-described embodiments, a computer program for causing hardware such as the CPU 150, the ROM 152, and the RAM 154 to execute a function equivalent to each configuration of the information processing apparatus 10 or the information processing apparatus 40 can be provided. In addition, a recording medium on which the computer program is recorded is provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1) An information processing apparatus including
a decision unit configured to decide, in accordance with playback target content, a processing pattern of processing to be executed in association with playback of the content, from among a plurality of processing patterns.

(2) The information processing apparatus according to (1),
in which
the content includes music, and
the decision unit decides the processing pattern of the processing to be executed, in accordance with a genre of playback target music.

(3) The information processing apparatus according to (1) or (2), in which
the content includes music, and
the decision unit decides the processing pattern of the processing to be executed, in accordance with a part being played among a plurality of parts included in playback target music.
(4) The information processing apparatus according to (3),
in which when the part being played transitions to the next part, the decision unit decides one of a plurality of processing patterns associated with the next part as a processing pattern of processing to be newly executed.
(5) The information processing apparatus according to any one of (1) to (4), in which
the content includes music, and
the decision unit decides the processing pattern of the processing to be executed, in accordance with a tempo of playback target music.
(6) The information processing apparatus according to any one of (1) to (5), in which
the content includes music, and
the decision unit decides the processing pattern of the processing to be executed, in accordance with a time of playback target music.
(7) The information processing apparatus according to any one of (1) to (6), further including
a processing control unit configured to cause a control target to execute processing corresponding to the processing pattern decided by the decision unit, in association with playback of the content.
(8) The information processing apparatus according to (7),
in which the processing control unit causes a plurality of control targets to execute processing corresponding to the processing pattern decided by the decision unit, in association with playback of the content.
(9) The information processing apparatus according to (8), in which
the processing pattern includes a plurality of sub-patterns, and
the processing control unit causes different control targets to execute processing corresponding to the plurality of sub-patterns included in the processing pattern decided by the decision unit.
(10) The information processing apparatus according to any one of (7) to (9), in which
the content includes music, and
the processing control unit changes a tempo of processing corresponding to the processing pattern decided by the decision unit, in accordance with a tempo of music being played.
(11) The information processing apparatus according to any one of (1) to (10),
in which the processing is processing of producing vibration.
(12) The information processing apparatus according to any one of (1) to (10),
in which the processing is display processing of illumination or display processing of animation.
(13) The information processing apparatus according to any one of (1) to (10),
in which the processing is processing of moving a control target.
(14) The information processing apparatus according to any one of (1) to (13),
in which the processing is executed concurrently with playback of the content.
(15) The information processing apparatus according to any one of (1) to (14),
in which the decision unit decides the processing pattern of the processing to be executed, further in accordance with information on a state of a control target.
(16) The information processing apparatus according to any one of (1) to (15),
in which the decision unit decides the processing pattern of the processing to be executed, further in accordance with information on a user who uses the content.
(17) The information processing apparatus according to any one of (1) to (16),
in which the decision unit further decides a processing pattern of processing to be executed in association with transmission of information from a first user to a second user, from among the plurality of processing patterns, in accordance with a relationship between the first user and the second user.
(18) The information processing apparatus according to any one of (1) to (16),
in which the decision unit further decides a processing pattern of processing to be executed in association with transmission of information from a first user to a second user, from among the plurality of processing patterns, in accordance with information transmitted from the first user to the second user.
(19) An information processing method including
deciding, in accordance with playback target content, a processing pattern of processing to be executed in association with playback of the content, from among a plurality of processing patterns, by a processor.
(20) A program causing a computer to function as
a decision unit configured to decide, in accordance with playback target content, a processing pattern of processing to be executed in association with playback of the content, from among a plurality of processing patterns.

What is claimed is:
1. An information processing system comprising:
circuitry configured to
decide, in accordance with audio content, a processing pattern of processing to be executed in association with playback of the audio content, from among a plurality of processing patterns, wherein the processing pattern is at least processing of producing a vibration pattern; and
transmit, to a reproduction device configured to reproduce the audio content, the audio content and the processing pattern to be executed in association with playback of the audio content; and
the reproduction device configured to reproduce the audio content and superimposes data corresponding to the processing pattern in an inaudible region of sound to be output by the reproduction device.
2. The information processing system according to claim 1, wherein
the audio content includes music, and
the circuitry is configured to decide the processing pattern of the processing to be executed, in accordance with a genre of the music.
3. The information processing system according to claim 1, wherein
the audio content includes music, and
the circuitry is configured to decide the processing pattern of the processing to be executed, in accordance with a part being played among a plurality of parts included in the music.

4. The information processing system according to claim 3, wherein
when the part being played transitions to the next part, the circuitry decides one of a plurality of processing patterns associated with the next part as a processing pattern of processing to be newly executed.

5. The information processing system according to claim 1, wherein
the audio content includes music, and
the circuitry decides the processing pattern of the processing to be executed, in accordance with a tempo of the music.

6. The information processing system according to claim 1, wherein
the audio content includes music, and
the circuitry decides the processing pattern of the processing to be executed, in accordance with a time of playback of the music.

7. The information processing system according to claim 1, wherein
a control target is configured to receive the data corresponding to the processing pattern included in the inaudible region of sound output by the reproduction device and reproduce the vibration pattern based on the data.

8. The information processing system according to claim 7, wherein
a plurality of control targets are configured to receive the data corresponding to the processing pattern included in the inaudible region of sound output by the reproduction device and reproduce the vibration pattern based on the data.

9. The information processing system according to claim 8, wherein
the processing pattern includes a plurality of sub-patterns, and
the circuitry causes different control targets to execute processing corresponding to the plurality of sub-patterns included in the processing pattern.

10. The information processing system according to claim 7, wherein
the audio content includes music, and
the circuitry changes a tempo of processing corresponding to the processing pattern, in accordance with a tempo of music being played.

11. The information processing system according to claim 1, wherein the processing includes display processing of illumination or display processing of animation.

12. The information processing system according to claim 1, wherein the processing includes processing of moving a control target.

13. The information processing system according to claim 1, wherein the processing is executed concurrently with playback of the audio content.

14. The information processing system according to claim 1, wherein
the circuitry decides the processing pattern of the processing to be executed in accordance with information on a state of a control target.

15. The information processing system according to claim 1, wherein
the circuitry decides the processing pattern of the processing to be executed in accordance with information on a user who uses the content.

16. The information processing system according to claim 1, wherein
the circuitry decides a processing pattern of processing to be executed in association with transmission of information from a first user to a second user, from among the plurality of processing patterns, in accordance with a relationship between the first user and the second user.

17. The information processing system according to claim 1, wherein
the circuitry decides a processing pattern of processing to be executed in association with transmission of information from a first user to a second user, from among the plurality of processing patterns, in accordance with information transmitted from the first user to the second user.

18. An information processing method comprising:
deciding, by a first information processing apparatus in accordance with audio content, a processing pattern of processing to be executed in association with playback of the audio content, from among a plurality of processing patterns, wherein the processing pattern is at least processing of producing a vibration pattern; and
transmitting, from the first information processing apparatus to a reproduction device configured to reproduce the audio content, the audio content and the processing pattern to be executed in association with playback of the audio content, wherein
the reproduction device reproduces the audio content and superimposes data corresponding to the processing pattern in an inaudible region of sound to be output by the reproduction device.

19. An information processing method comprising:
deciding, by a first information processing apparatus in accordance with audio content, a processing pattern of processing to be executed in association with playback of the audio content, from among a plurality of processing patterns, wherein the processing pattern is at least processing of producing a vibration pattern;
transmitting, from the first information processing apparatus to a reproduction device configured to reproduce the audio content, the audio content and the processing pattern to be executed in association with playback of the audio content;
reproducing, by the reproduction device, the audio content;
superimposing, by the reproduction device, data corresponding to the processing pattern in an inaudible region of sound to be output by the reproduction device;
receiving, at a second information processing device, the data corresponding to the processing pattern output by the reproduction device; and
outputting, by the second information processing device, a vibration pattern based on the received data corresponding to the processing pattern output by the reproduction device.

* * * * *